United States Patent
Hadas et al.

(10) Patent No.: US 11,150,831 B2
(45) Date of Patent: Oct. 19, 2021

(54) VIRTUAL MACHINE SYNCHRONIZATION AND RECOVERY

(71) Applicant: Red Hat, Inc., Raleigh, NC (US)

(72) Inventors: Arik Hadas, Raanana (IL); Maor Lipchuk, Raanana (IL)

(73) Assignee: Red Hat, Inc., Raleigh, NC (US)

(*) Notice: Subject to any disclaimer, the term of this patent is extended or adjusted under 35 U.S.C. 154(b) by 110 days.

(21) Appl. No.: 16/366,217

(22) Filed: Mar. 27, 2019

(65) Prior Publication Data
US 2020/0310650 A1    Oct. 1, 2020

(51) Int. Cl.
G06F 12/00 (2006.01)
G06F 3/06 (2006.01)
G06F 9/50 (2006.01)

(52) U.S. Cl.
CPC ............ *G06F 3/065* (2013.01); *G06F 3/0619* (2013.01); *G06F 3/0664* (2013.01); *G06F 3/0673* (2013.01); *G06F 9/5077* (2013.01)

(58) Field of Classification Search
CPC .......... G06F 3/06; G06F 3/065; G06F 3/0619; G06F 3/0631; G06F 3/0604; G06F 3/0664; G06F 3/0659; G06F 3/0673; G06F 9/5061; G06F 9/5077; G06F 9/50
See application file for complete search history.

(56) References Cited

U.S. PATENT DOCUMENTS

| | | | |
|---|---|---|---|
| 7,093,086 B1* | 8/2006 | van Rietschote | G06F 11/1438 711/161 |
| 9,632,703 B2 | 4/2017 | Litke et al. | |
| 9,727,257 B2 | 8/2017 | Litke et al. | |
| 10,114,570 B2 | 10/2018 | Hadas et al. | |
| 2015/0066857 A1* | 3/2015 | Dayal | G06F 16/128 707/639 |
| 2015/0193248 A1* | 7/2015 | Noel | G06F 9/45558 718/1 |
| 2016/0124665 A1* | 5/2016 | Jain | H04L 61/2007 711/162 |
| 2016/0124669 A1* | 5/2016 | Harris | G06F 3/0619 711/162 |
| 2016/0231944 A1* | 8/2016 | Litke | G06F 3/0604 |

OTHER PUBLICATIONS

Author Unknown, "Snapshots," Anatomy of LVM, Section 3.8, tldp.org/HOWTO/LVM-HOWTO/snapshotintro.html, accessed Feb. 20, 2019, 1 page.

* cited by examiner

*Primary Examiner* — Shawn X Gu
(74) *Attorney, Agent, or Firm* — Withrow & Terranova, PLLC

(57) ABSTRACT

Virtual machine synchronization and recovery is disclosed. At a first instance in time, a first snapshot request to generate a first snapshot of a virtual machine (VM) is received. The VM utilizes a storage unit. A first snapshot layer is generated for the storage unit. The first snapshot layer preserves a state of the storage unit at the first instance in time. A first VM record that corresponds to the first snapshot request and that includes a first VM record identifier (ID) is generated. The first VM record ID is stored in metadata associated with the first snapshot layer, and the first VM record is stored in a first location.

17 Claims, 22 Drawing Sheets

VIRTUAL MACHINE SYNCHRONIZATION AND RECOVERY

BACKGROUND

A snapshot of a virtual machine (VM) in an electronic computing environment maintains the state of the VM, and any storage units used by the VM, at the time of the snapshot. Subsequently, the VM may be restarted to the state of the VM at the time of the snapshot, and the VM will operate as if any modifications to the VM, or to any storage units used by the VM, after the time of the snapshot never occurred.

SUMMARY

The examples disclosed herein facilitate recovery of a virtual machine (VM). In particular, the examples disclosed herein determine whether a chain of VM records that identify various snapshots taken of the VM are synchronized with corresponding snapshot layers of storage devices used by the VM. Among other advantages, the examples implement an improved VM disaster recovery mechanism that can facilitate restarting a VM even though there is a lack of synchronization between VM records and snapshot layers of the storage devices used by the VM.

In one example, a method is provided. The method includes receiving, at a first instance in time, a first snapshot request to generate a first snapshot of a VM, the VM utilizing a storage unit. The method further includes generating, for the storage unit, a first snapshot layer, the first snapshot layer preserving a state of the storage unit at the first instance in time. The method further includes generating a first VM record that corresponds to the first snapshot request and that includes a first VM record identifier (ID). The method further includes storing, in metadata associated with the first snapshot layer, the first VM record ID and storing the first VM record in a first location.

In another example, a computing device is provided. The computing device includes a memory and a processor device coupled to the memory. The processor device is to receive, at a first instance in time, a first snapshot request to generate a first snapshot of a VM, the VM utilizing a storage unit. The processor device is further to generate, for the storage unit, a first snapshot layer, the first snapshot layer preserving a state of the storage unit at the first instance in time. The processor device is further to generate a first VM record that corresponds to the first snapshot request and that includes a first VM record ID. The processor device is further to store, in metadata associated with the first snapshot layer, the first VM record ID, and store the first VM record in a first location.

In another example a computer program product is provided. The computer program product is stored on a non-transitory computer-readable storage medium and includes instructions to cause a processor device to receive, at a first instance in time, a first snapshot request to generate a first snapshot of a VM, the VM utilizing a storage unit. The instructions further cause the processor device to generate, for the storage unit, a first snapshot layer, the first snapshot layer preserving a state of the storage unit at the first instance in time. The instructions further cause the processor device to generate a first VM record that corresponds to the first snapshot request and that includes a first VM record ID. The instructions further cause the processor device to store, in metadata associated with the first snapshot layer, the first VM record ID, and store the first VM record in a first location.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
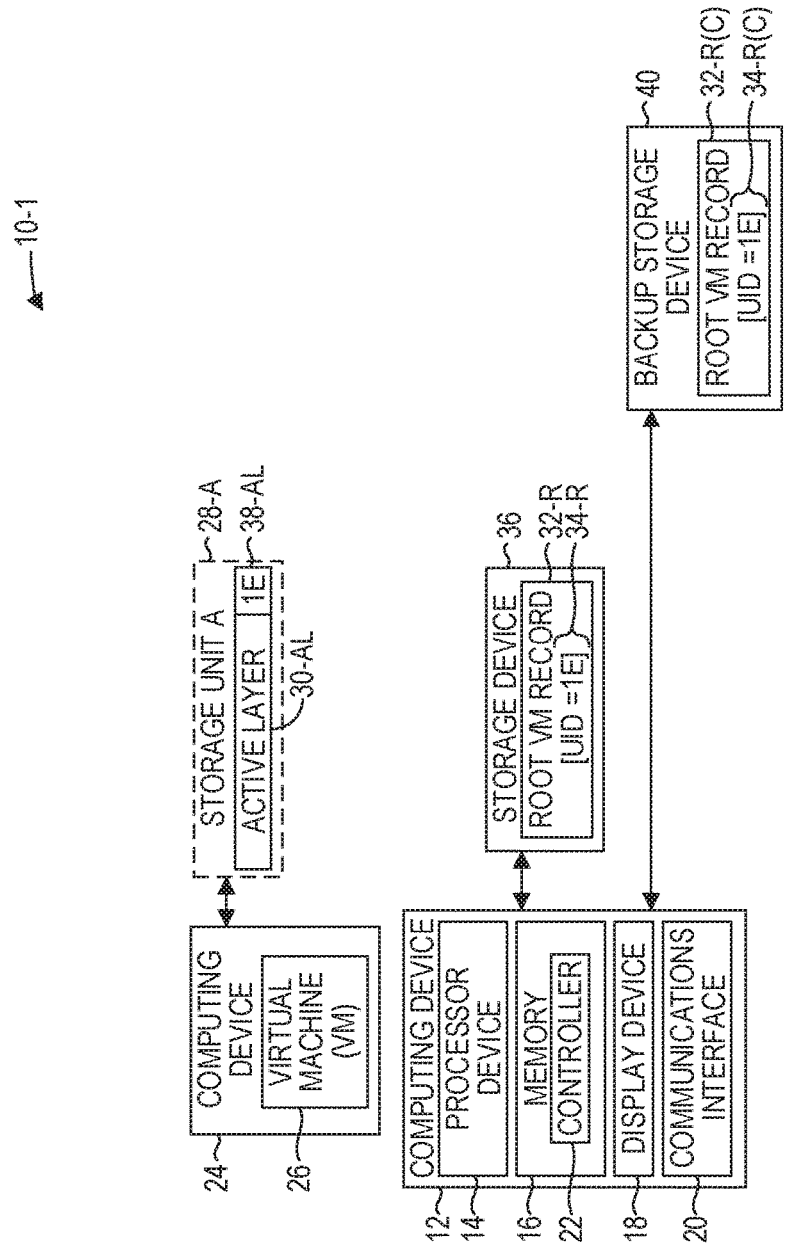
FIGS. 1A-1D are block diagrams illustrating an environment in which examples may be practiced, and a subsequent recovery process where virtual machine (VM) records and storage unit layers are in synchronization.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The phrase "storage unit" as used herein broadly refers to any unit of storage for which a "snapshot" can be taken to preserve the state of the unit of storage at the point in time of the snapshot. A storage unit may be referred to by different names in different file system architectures. For example, a storage unit, in a Linux context, may refer to a volume, whether logical or physical. The volume may be implemented on any number of physical hard drives. In a Windows® context, the term "storage unit" may also refer to volumes, sometimes referred to as "drive volumes" such as those identified via a letter, such as "A:" or "C:".

The term "snapshot" as used herein refers generally to the mechanism by which a particular computer architecture implements the ability to concurrently maintain multiple different chronological states of an entity, such as a storage unit or a virtual machine. The term "snapshot" as used herein, when used as a command or operation, refers to the generation, at a particular instance in time, of information that preserves the current state of the entity being snapshotted. With reference to a storage unit, the term "snapshot layer" as used herein refers to the actual data structure generated that preserves the state of the storage unit at that instance in time. The implementation of a snapshot may differ depending on the particular file system or computer architecture at issue. In a Linux environment, the snapshot layer may be implemented via a volume that is related to but separate from the volume in which future modifications of the storage unit will be reflected. When a VM is snapshotted, aspects of the current state of the VM may also be captured, such as a current state of the memory, a current state of the configuration of the VM, the storage units used by the VM at the time of the snapshot, and other information relevant to restoring the VM at that instant in time. Snapshotting a VM may, by default, cause the storage units used by the VM to be snapshotted.

The term "virtual machine" as used herein refers to an emulation of a computing system, and can be implemented via any number of different virtualization technologies, including, by way of non-limiting example, QEMU, Kernel-based Virtual Machine (KVM), VMware® virtualization technologies, Microsoft® Hyper-V, or the like.

A snapshot of a virtual machine (VM) in an electronic computing environment maintains the state of the VM, and any storage units used by the VM, at the time of the snapshot. Subsequently, the VM may be restarted to the state of the VM at the time of the snapshot, and the VM will operate as if any modifications to the VM, or any storage units used by the VM, after the time of the snapshot never occurred.

For disaster recovery purposes, backups of VM snapshots may be maintained. In particular, information relating to VM snapshots may be maintained both in the actual environment in which the VM operates, and copies may be maintained at a remote location so that if a disaster occurs the VM may be relatively rapidly restarted from the remote location with minimal downtime. A VM snapshot typically results in the generation of a VM record, which maintains information about the VM, such as a current state of the memory, a current state of the configuration of the VM, the storage units used by the VM at the time of the snapshot, and other information relevant to restoring the VM at that instant in time. Snapshotting a VM may, by default, also cause the storage units used by the VM to be snapshotted. A snapshot of a storage unit causes a data structure, referred to herein as a snapshot layer, to be generated that preserves the state of the storage unit at that instance in time. Subsequent modifications to the storage unit will be reflected in an active layer of the storage unit.

Each VM record maintains information that can be used to identify either an earlier-generated VM record or a subsequently generated VM record such that it is possible to determine, at the time of recovery, the chronological chain of VM records. Similarly, each snapshot layer maintains information that can be used to identify an earlier-generated snapshot layer or a subsequently generated snapshot layer such that it is possible to determine, at the time of recovery, the chronological chain of snapshot layers.

However, a snapshot layer does not contain information that explicitly identifies the VM record to which the respective snapshot layer corresponds. Due to timing issues, it is possible that during recovery, the chain of VM records does not match the chain of snapshot layers. In such situations, it may be impossible to determine which snapshot layers correspond to which VM records, and the recovery process will fail. As an example, assume that a VM that utilizes one storage unit is snapshotted. A new VM record is generated and a new snapshot layer that preserves the state of the storage unit at the time of the snapshot is created. Prior to the new VM record being copied to a backup location, assume further that there is a disaster, that the system terminates and that the chain of original VM records is corrupted and cannot be used. An attempt is then made to recover the VM from the backup location. The recovery process determines that the storage unit has two layers, an active layer and a corresponding snapshot layer. The recovery process identifies a current VM record on the backup location, but there is no VM record that corresponds to the snapshot layer. The recovery process cannot determine which of the two layers of the storage unit, the active layer or the snapshot layer, correspond to the current VM record because there is no correspondence maintained in the storage unit layers that identify the VM record to which the storage unit layers correspond. Thus, the recovery process fails.

The examples disclosed herein facilitate recovery of VMs even when the chain of VM records is not synchronized with the chain of storage unit layers associated with a storage unit. The examples allow, during recovery, a recovery process to determine which layers of a storage unit correspond to a missing VM record, and allow the recovery process to automatically take actions to resolve the lack of synchronization, or, to provide the information to an operator so that the operator can take appropriate action. The examples also allow, during recovery, the recovery process to determine whether a VM record exists for which there is no corresponding storage unit layer, and allow the recovery process to automatically take actions to resolve the lack of synchronization, or to provide the information to an operator so that the operator can take appropriate action. Thus, the examples implement an improved VM disaster recovery mechanism that can restart a VM even though there is a lack of synchronization between VM records and storage unit layers.

In some examples, a controller receives a first snapshot request to generate a first snapshot of a VM at a first instance in time. The controller generates, for a storage unit, a first snapshot layer. The first snapshot layer preserves the state of the storage unit at the first instance in time. The controller also generates and stores in a first location a first VM record that corresponds to the first snapshot request and that includes a first VM record identifier (ID). The controller stores, in metadata associated with the first snapshot layer, the first VM record ID. If at a future point in time a recovery process is initiated, the correspondence between the first snapshot layer and the VM record can be established via the first unique VM record ID in the metadata of the first snapshot layer and the first VM record ID in the VM record.

FIGS. 1A-1D are block diagrams illustrating an environment 10-1 in which examples may be practiced, and a subsequent recovery process where the VM records and storage unit layers are in synchronization. In some examples, the environment 10-1 may comprise a cloud computing environment, such as an Amazon® Amazon Web Services (AWS) cloud computing environment or a Microsoft® Azure cloud computing environment. Referring first to FIG. 1A, the environment 10-1 includes an operations computing device 12 (hereinafter, computing device 12 for the sake of brevity). The computing device 12 includes a processor device 14 that is coupled to a memory 16, a display device 18, and a communications interface 20. The memory 16 includes a controller 22 that, as described in detail herein, implements aspects of the disclosed examples. The controller 22 may represent any suitable VM controller modified to incorporate the functionality herein, including, by way of non-limiting example, the oVirt VM controller technology available at ovirt.org. It will be noted that, because the controller 22 is a component of the computing device 12, functionality implemented by the controller 22 may be attributed herein to the computing device 12 generally. Moreover, in examples where the controller 22 comprises software instructions that program the processor device 14 to carry out functionality discussed herein, functionality implemented by the controller 22 may be attributed herein to the processor device 14.

The environment 10-1 also includes a computing device 24 on which a VM 26 executes. The VM 26 utilizes, and is thus associated with, a storage unit 28-A. The storage unit 28-A represents any mechanism for storing data and as discussed above may be implemented, for example, as one or more volumes of other data structures. The storage unit 28-A may have multiple different layers, including an active layer 30-AL and, for each snapshot of the storage unit 28-A, a snapshot layer. The active layer 30-AL represents the storage unit 28-A at a current instance in time. Modifications made to the storage unit 28-A are reflected in the active layer 30-AL. Note that the VM 26 is an executing instantiation of the VM 26; however, static instances of the VM 26 that are used to initiate an executing instantiation of the VM 26 may be stored on a storage device.

When the controller 22 initiates the VM 26 on the computing device 24, the controller 22 generates a root (sometimes referred to as "active" or "current") VM record 32-R. The controller 22 also generates a unique VM record identifier (ID) 34-R ("1E") and stores the unique VM record ID 34-R in the VM record 32-R. The controller 22 stores the root VM record 32-R on a storage device 36. The root VM record 32-R may also contain an identifier of the active layer 30-AL that facilitates locating the active layer 30-AL, but may otherwise be empty and is used primarily to establish a root of a hierarchy that may subsequently include one or more VM records that correspond to snapshots of the VM 26. The controller 22 stores, in VM record ID metadata 38-AL associated with the active layer 30-AL, the unique VM record ID 34-R to establish a correspondence between the active layer 30-AL and the root VM record 32-R. The controller 22 stores a root VM record 32-R(C), which is a copy of the root VM record 32-R, in a backup location on a backup storage device 40 for use in the event of a disaster that corrupts or otherwise renders the storage device 36 unusable or inaccessible. The root VM record 32-R(C) includes a unique VM record ID 34-R(C), which is a copy of the unique VM record ID 34-R.

Figure 1B:
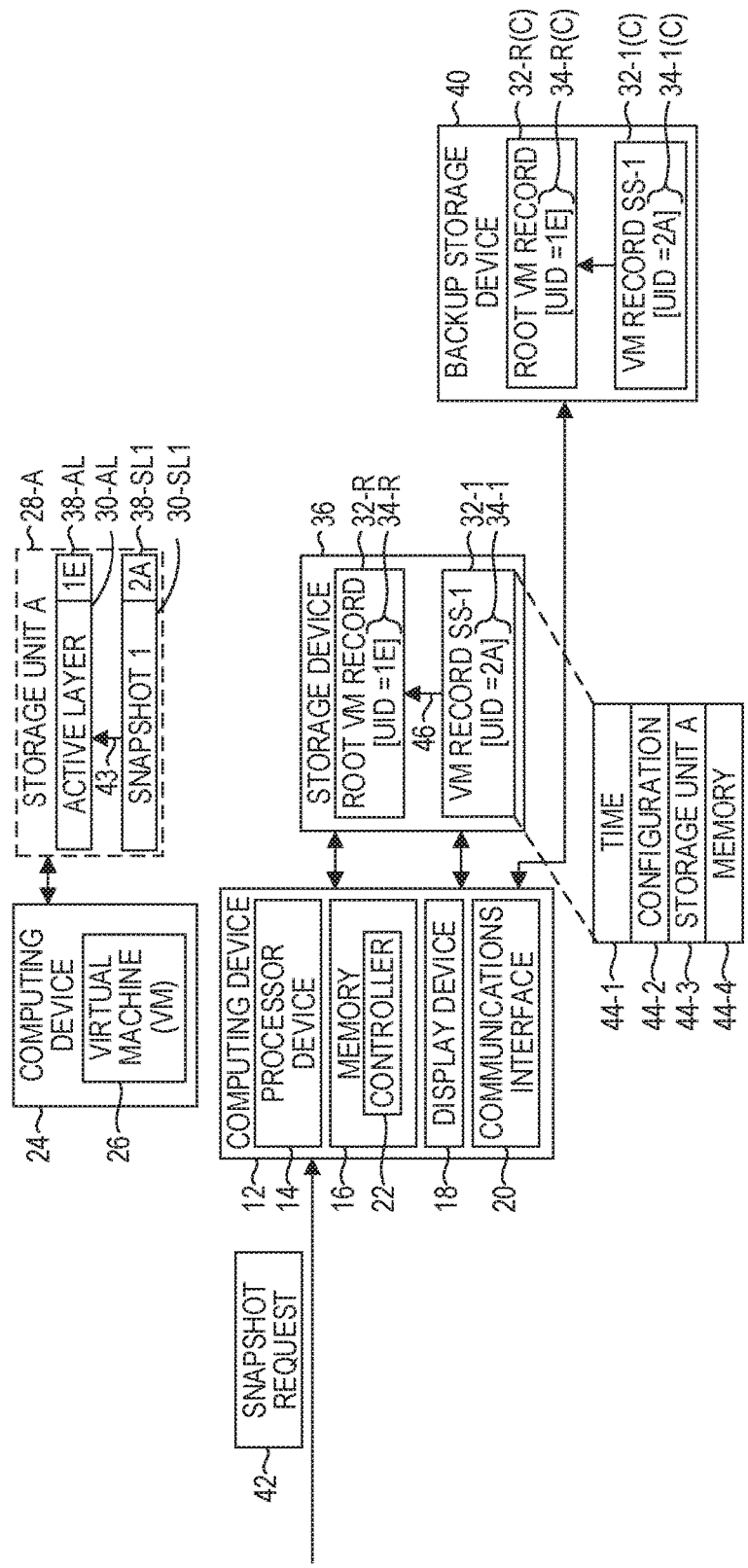

Referring now to FIG. 1B, the environment 10-1 is shown at a subsequent point in time to that illustrated in FIG. 1A. The controller 22 receives a snapshot request 42 that requests that a snapshot be taken of the VM 26. In response, the controller 22 directly or indirectly causes a snapshot layer 30-SL1 to be generated. The snapshot layer 30-SL1 preserves the state of the storage unit 28-A at the instant in time of the snapshot. Subsequent modifications to the storage unit 28-A, such as writing new data to the storage unit 28-A, or removing existing data from the storage unit 28-A, will be reflected in the active layer 30-AL, but not in the snapshot layer 30-SL1. Even after subsequent modifications to the storage unit 28-A, the snapshot layer 30-SL1 will still reflect the data of the storage unit 28-A as it existed at the time of the snapshot request 42.

As indicated by arrow 43, the snapshot layer 30-SL1 is a child of the active layer 30-AL. The relationship illustrated by the arrow 43 may be established by data stored in VM record ID metadata 38-SL1 of the snapshot layer 30-SL1, or in the metadata 38-AL of the active layer 30-AL. Moreover, the metadata 38-AL of the active layer 30-AL may also identify the location of the snapshot layer 30-SL1, such that, given the location of the active layer 30-AL, the chain of any snapshot layers 30 can be identified and located.

Note that throughout the specification and drawings the snapshot layers are depicted as being children of the active layer; however, the examples disclosed herein are not limited to any specific hierarchy of layers and, for example, can operate in systems where the active layer is a child of a snapshot layer. Similarly, the VM records that correspond to the snapshot layers may also have a corresponding hierarchy.

The controller 22 generates a VM record 32-1 that corresponds to the snapshot request 42 and that includes a unique VM record ID 34-1. The controller 22 stores, in the VM record ID metadata 38-SL1, the unique VM record ID 34-1 to establish a correspondence between the snapshot layer 30-SL1 and the VM record 32-1.

The VM record 32-1 may include, for example, information about the state of the VM 26 at the time of the snapshot request 42, such as a current time 44-1, current VM configuration options 44-2, storage unit information 44-3 that identifies the storage units associated with the VM 26, in this case the storage unit 28-A, and a current copy 44-4 of the memory of the VM 26. As indicated by arrow 46, the VM record 32-1 may also contain information that indicates that it is a child of the root VM record 32-R, such as, by way of non-limiting example, a pointer to the root VM record 32-R.

The controller 22 stores a VM record 32-1(C), which is a copy of the VM record 32-1, in the backup location on the backup storage device 40 for use in the event of a disaster that corrupts or otherwise renders the storage device 36 unusable or inaccessible. The VM record 32-1(C) includes a unique VM record ID 34-1(C) which is a copy of the unique VM record ID 34-1.

Figure 1C:
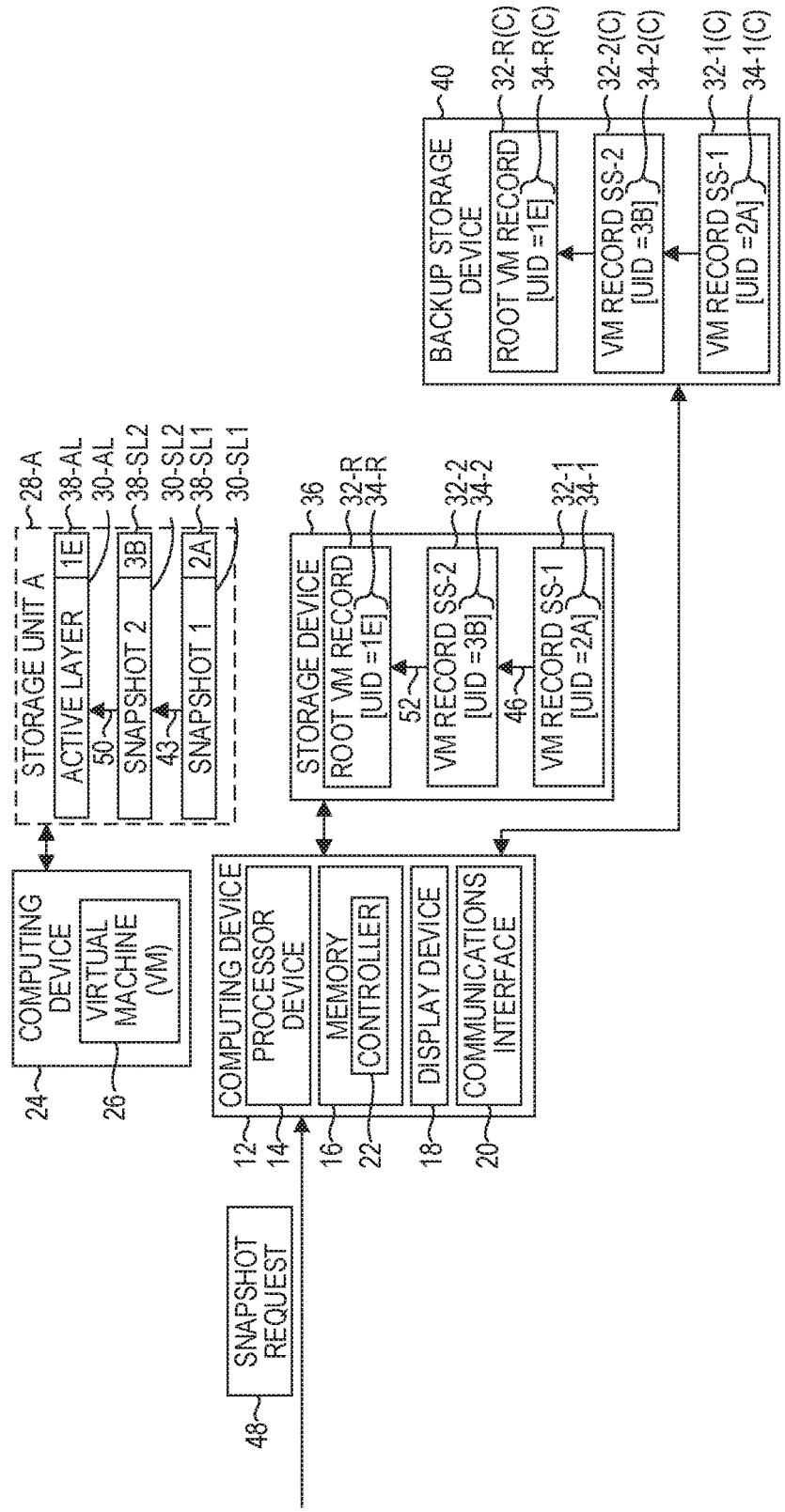

Referring now to FIG. 1C, the environment 10-1 is shown at a subsequent point in time to that illustrated in FIG. 1B. The controller 22 receives a second snapshot request 48 that requests that a second snapshot be taken of the VM 26. Note that the second snapshot request 48 may occur seconds, hours, days or any other length of time after the first snapshot request 42. In response, the controller 22 causes a snapshot layer 30-SL2 to be generated. The snapshot layer 30-SL2 preserves the state of the storage unit 28-A at the instant in time of the second snapshot request 48. As indicated by arrow 50, the snapshot layer 30-SL2 is a child of the active layer 30-AL. The arrow 43 shows that the snapshot layer 30-SL1 is now a child of the snapshot layer 30-SL2. Thus, in this example, older snapshot layers become children to newer snapshot layers, although it will be appreciated that any other hierarchy could be used to establish an order of the layers of the storage unit 28-A.

The controller 22 generates a VM record 32-2 that corresponds to the snapshot request 48 and that includes a unique VM record ID 34-2. The controller 22 stores, in VM record ID metadata 38-SL2, the unique VM record ID 34-2 to establish a correspondence between the snapshot layer 30-SL2 and the VM record 32-2.

The VM record 32-2 may include, for example, identical information as discussed above with regard to the VM record 32-1, except that such information reflects the state of things at the time of the snapshot request 48. As indicated by arrow 52, the VM record 32-2 also contains information that indicates that it is a child of the root VM record 32-R, such as, by way of non-limiting example, a pointer to the root VM record 32-R. The arrow 46 indicates that the VM record 32-1 is now a child of the VM record 32-2.

The controller 22 stores a VM record 32-2(C), which is a copy of the VM record 32-2, in the backup location on the backup storage device 40 for use in the event of a disaster that corrupts or otherwise renders the storage device 36 unusable or inaccessible. The VM record 32-2(C) includes a unique VM record ID 34-2(C), which is a copy of the unique VM record ID 34-2.

Figure 1D:
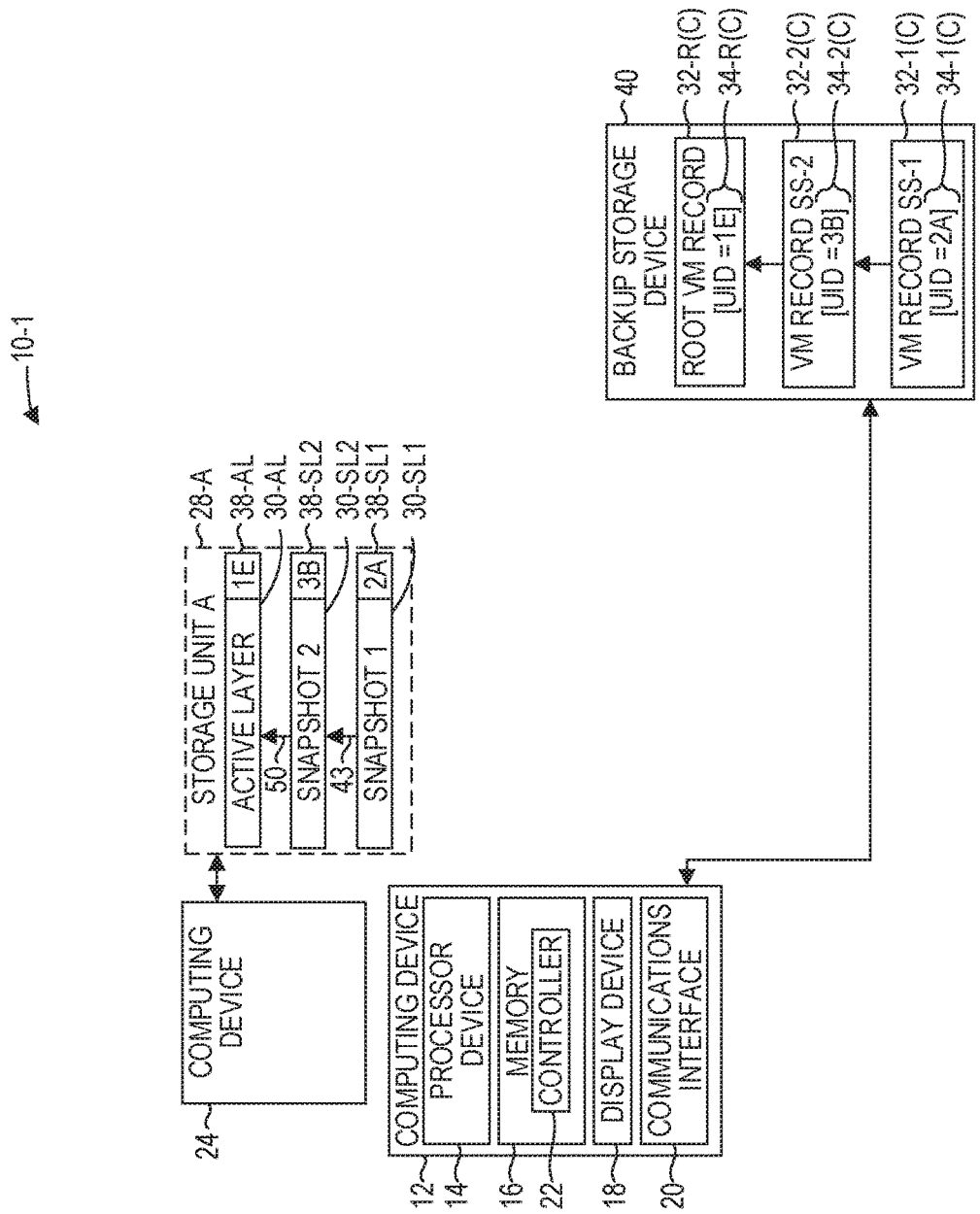

Referring now to FIG. 1D, the environment 10-1 is shown at a subsequent point in time to that illustrated in FIG. 1C. In particular, a disaster has occurred, the VM 26 has terminated, and the storage device 36 is no longer available. The controller 22 performs a synchronization analysis by accessing the VM records 32-R(C), 32-1(C), and 32-2(C) on the backup storage device 40 to obtain the respective unique VM record IDs 34-R(C), 34-1(C) and 34-2(C). The controller 22 accesses the storage unit 28-A, and, based on the VM record ID metadata 38-AL, determines that the active layer 30-AL corresponds to the root VM record 32-R(C). The controller 22, based on the VM record ID metadata 38-SL1, determines that the snapshot layer 30-SL1 corresponds to the VM record 32-1(C). The controller 22, based on the VM record ID metadata 38-SL2, determines that the snapshot layer 30-SL2 corresponds to the VM record 32-2(C). The controller 22, via the synchronization analysis, thus determines that each layer 30 identifies a VM record 32 that exists, and that for each VM record 32 a corresponding layer 30 of the storage unit 28-A exists, and thus that the VM records 32 and the layers 30 are synchronized. The controller 22 may then present to an operator information that allows the operator to indicate that a VM is to be restarted from the current time, from the time of the second snapshot, or from the time of the first snapshot.

Figure 2:
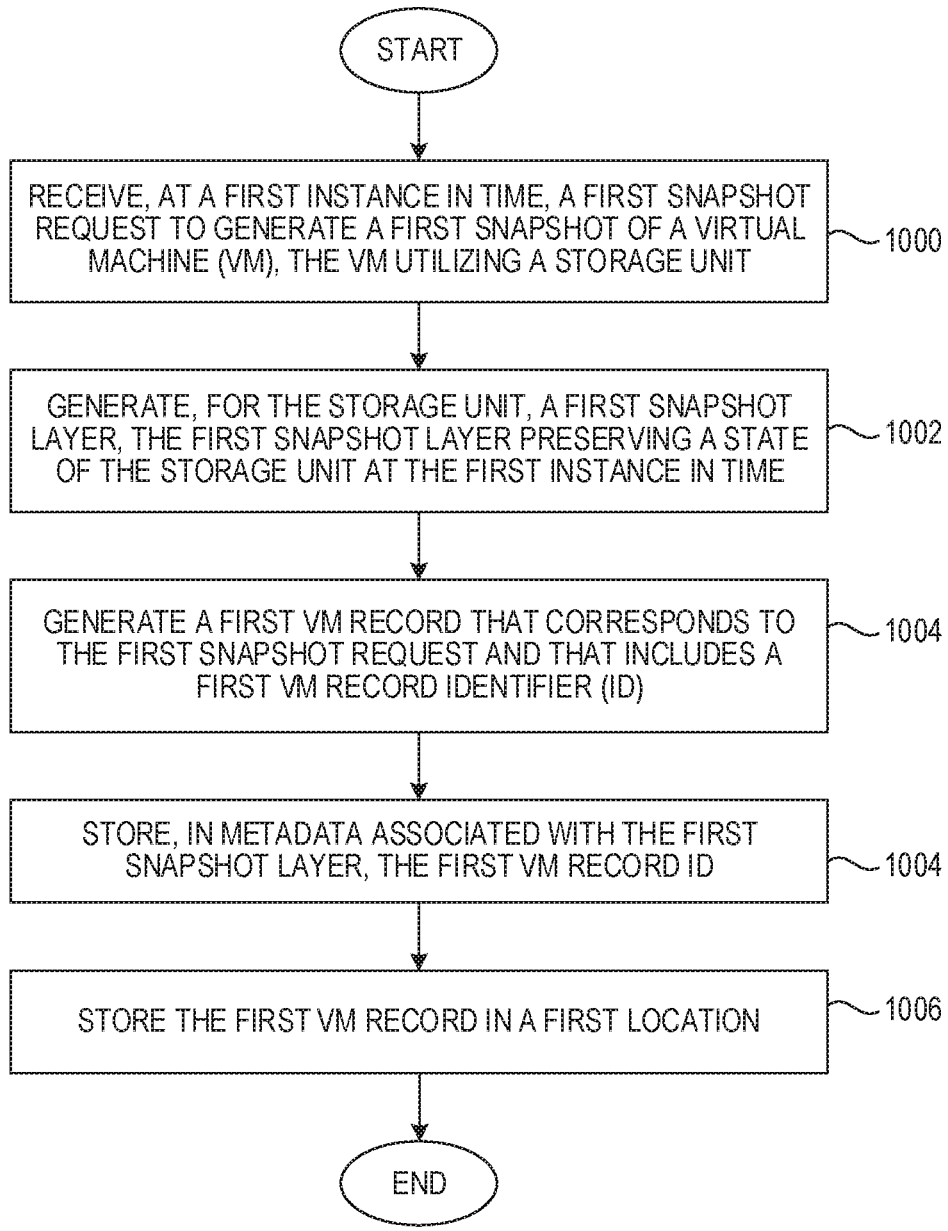
FIG. 2 is a flowchart of a method for VM synchronization according to one example.

FIG. 2 is a flowchart of a method for VM synchronization according to one example. FIG. 2 will be discussed in conjunction with FIGS. 1B-1C. The computing device 12 receives, at a first instance in time, the first snapshot request 42 to generate a first snapshot of the VM 26. The VM utilizes the storage unit 28-A (FIG. 2, block 1000). The computing device 12 generates, for the storage unit 28-A, the first snapshot layer 30-SL1. The first snapshot layer 30-SL1 preserves the state of the storage unit 28-A at the first instance in time (FIG. 2, block 1002). The computing device 12 generates the first VM record 32-1 that corresponds to the first snapshot request 42 and that includes the first unique VM record ID 34-1 (FIG. 2, block 1004). The computing device 12 stores, in the VM record ID metadata 38-SL1 associated with the first snapshot layer 30-SL1, the first VM record ID 34-1 (FIG. 2, block 1006). The computing device 12 stores the first VM record 32-1 in a first location, in this example, in the storage device 36 (FIG. 2, block 1008).

Figure 3:
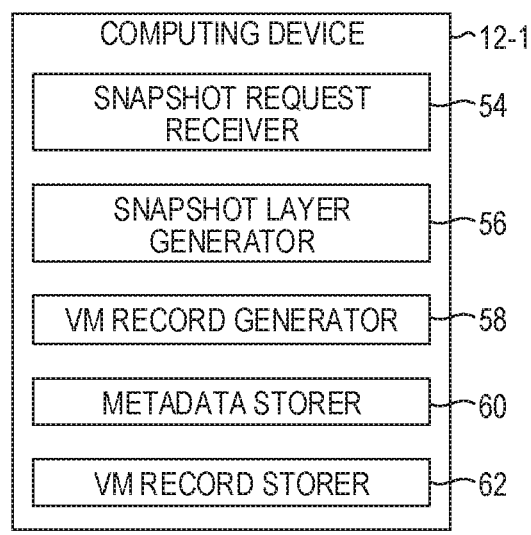
FIG. 3 is a block diagram of a computing device suitable for implementing aspects illustrated in FIGS. 1A-1D according to one implementation.

FIG. 3 is a block diagram of a computing device 12-1 according to another implementation. The computing device 12-1 implements identical functionality as that described above with regard to the computing device 12. The computing device 12-1 includes a snapshot request receiver 54 that is configured to receive a snapshot request to generate a snapshot of a VM.

The snapshot request receiver 54 may comprise executable software instructions configured to program a processor device to implement the functionality of receiving a snapshot request to generate a snapshot of a VM, may comprise circuitry including, by way of non-limiting example, an application-specific integrated circuit (ASIC), field-programmable gate array (FPGA), or may comprise a combination of executable software instructions and circuitry.

The computing device 12-1 also includes a snapshot layer generator 56 that is configured to generate, or cause the generation of, for a storage unit, a snapshot layer that preserves the state of the storage unit at that particular instance in time. In some implementations, the snapshot layer generator 56 may generate the snapshot by communicating appropriate commands to storage-providing technology that provides the storage unit. The snapshot layer generator 56 may comprise executable software instructions configured to program a processor device to implement the functionality of generating a snapshot layer for a storage unit, may comprise circuitry including, by way of non-limiting example, an ASIC, FPGA, or may comprise a combination of executable software instructions and circuitry.

The computing device 12-1 also includes a VM record generator 58 that is to generate a VM record that corresponds to a received snapshot request, and that includes a unique VM record ID. The VM record generator 58 may comprise executable software instructions to program a processor device to implement the functionality of generating a VM record that corresponds to a received snapshot request, and that includes a unique VM record ID, may comprise circuitry including, by way of non-limiting example, an ASIC, FPGA, or may comprise a combination of executable software instructions and circuitry.

The computing device 12-1 also includes a metadata storer 60 that is to store, in VM record ID metadata associated with the snapshot layer, the unique VM record ID. The metadata storer 60 may comprise executable software instructions to program a processor device to implement the functionality of storing, in VM record ID metadata associated with the snapshot layer, the unique VM record ID, may comprise circuitry including, by way of non-limiting example, an ASIC, FPGA, or may comprise a combination of executable software instructions and circuitry.

The computing device 12-1 also includes a VM record storer 62 that is to store the VM record in a first location. The VM record storer 62 may comprise executable software instructions to store the VM record in the first location, may comprise circuitry including, by way of non-limiting example, an ASIC, FPGA, or may comprise a combination of executable software instructions and circuitry.

Figure 4:
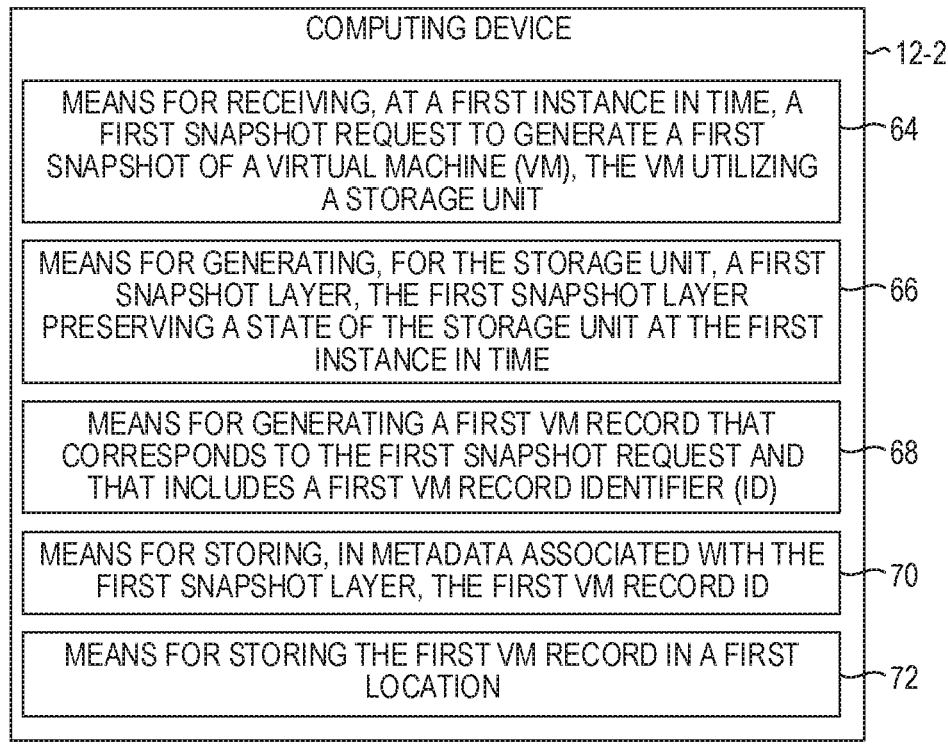
FIG. 4 is a block diagram of a computing device according to additional implementations.

FIG. 4 is a block diagram of a computing device 12-2 according to additional implementations. The computing device 12-2 implements identical functionality as that described above with regard to the computing device 12. In this implementation, the computing device 12-2 includes a means 64 for receiving, at a first instance in time, a first snapshot request to generate a first snapshot of a VM, the VM utilizing a storage unit. The means 64 may be implemented in any number of manners, including, for example, via the snapshot request receiver 54 illustrated in FIG. 3. The means 64 may, in some implementations, provide an application programming interface that may be invoked by a computing process to send a snapshot request, and/or may offer a user interface by which an operator can request that a snapshot of a VM be taken.

The computing device 12-2 also includes a means 66 for generating, for the storage unit, a first snapshot layer, the first snapshot layer preserving a state of the storage unit at the first instance in time. The means 66 may be implemented in any number of manners, including, for example, via the snapshot layer generator 56 illustrated in FIG. 3. The means 66 may, in some implementations, communicate with a storage technology or storage provider to cause the snapshot of the storage unit to be taken.

The computing device 12-2 also includes a means 68 for generating a first VM record that corresponds to the first snapshot request and that includes a first unique VM record ID. The means 68 may be implemented in any number of manners, including, for example, via the VM record generator 58 illustrated in FIG. 3. The means 68, in some implementations, calls a unique identifier generator to obtain a unique ID, and inserts the unique ID in the VM record. The means 68 may also obtain information about the state of the VM at the time of the snapshot request, such as the current time, the current VM configuration options, the storage unit information that identifies the storage units associated with the VM, and make a copy of the memory of the VM. The information about the state of the VM may then be stored in the VM record.

The computing device 12-2 also includes a means 70 for storing, in metadata associated with the first snapshot layer, the VM record ID. The means 70 may be implemented in any number of manners, including, for example, via the metadata storer 60 illustrated in FIG. 3. The computing device 12-2 also includes a means 72 for storing the first VM record in a first location. The means 72 may be implemented in any number of manners, including, for example, via the VM record storer 62 illustrated in FIG. 3.

Figure 5A:
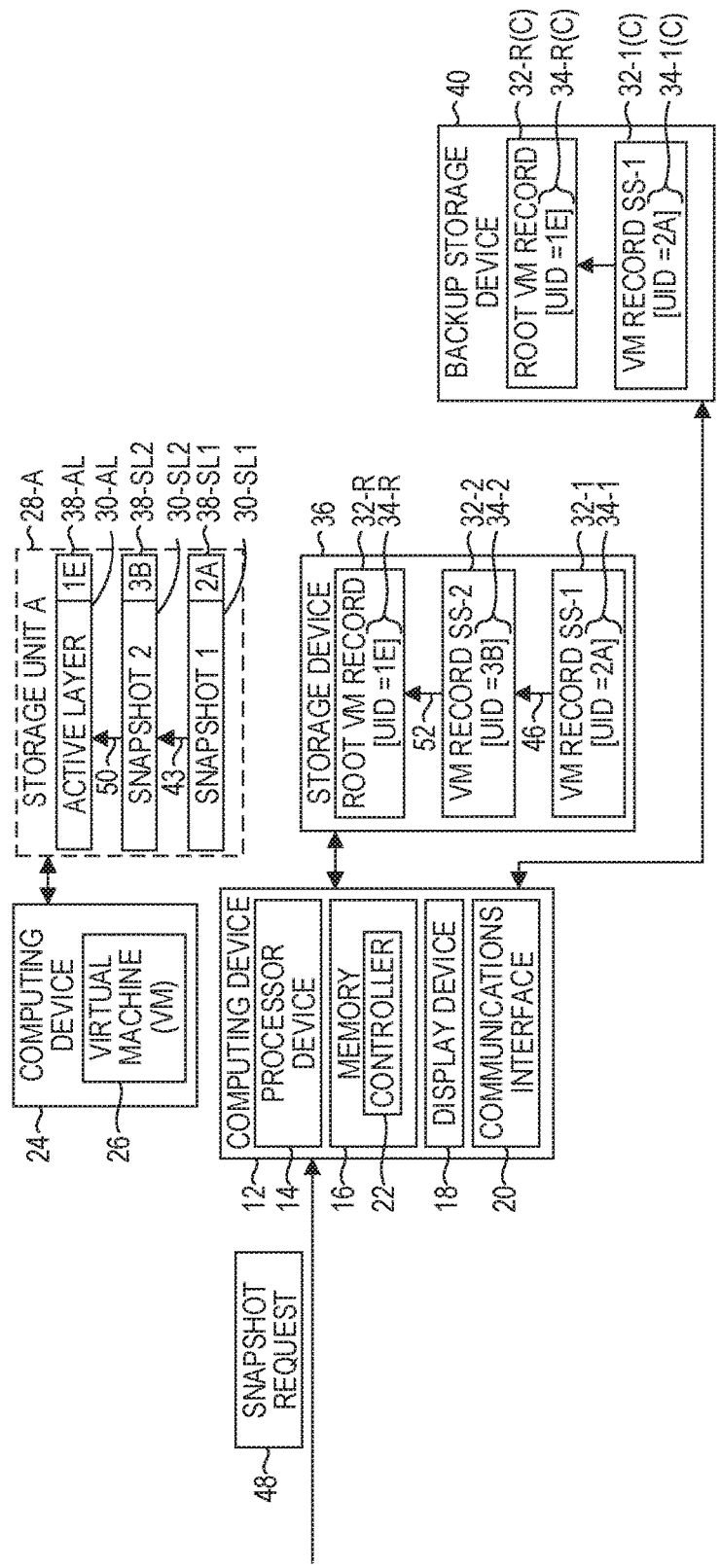
FIGS. 5A-5B are block diagrams illustrating the environment illustrated in FIG. 1 at different points in time to illustrate a VM synchronization analysis and recovery process according to one example.
Figure 5B:
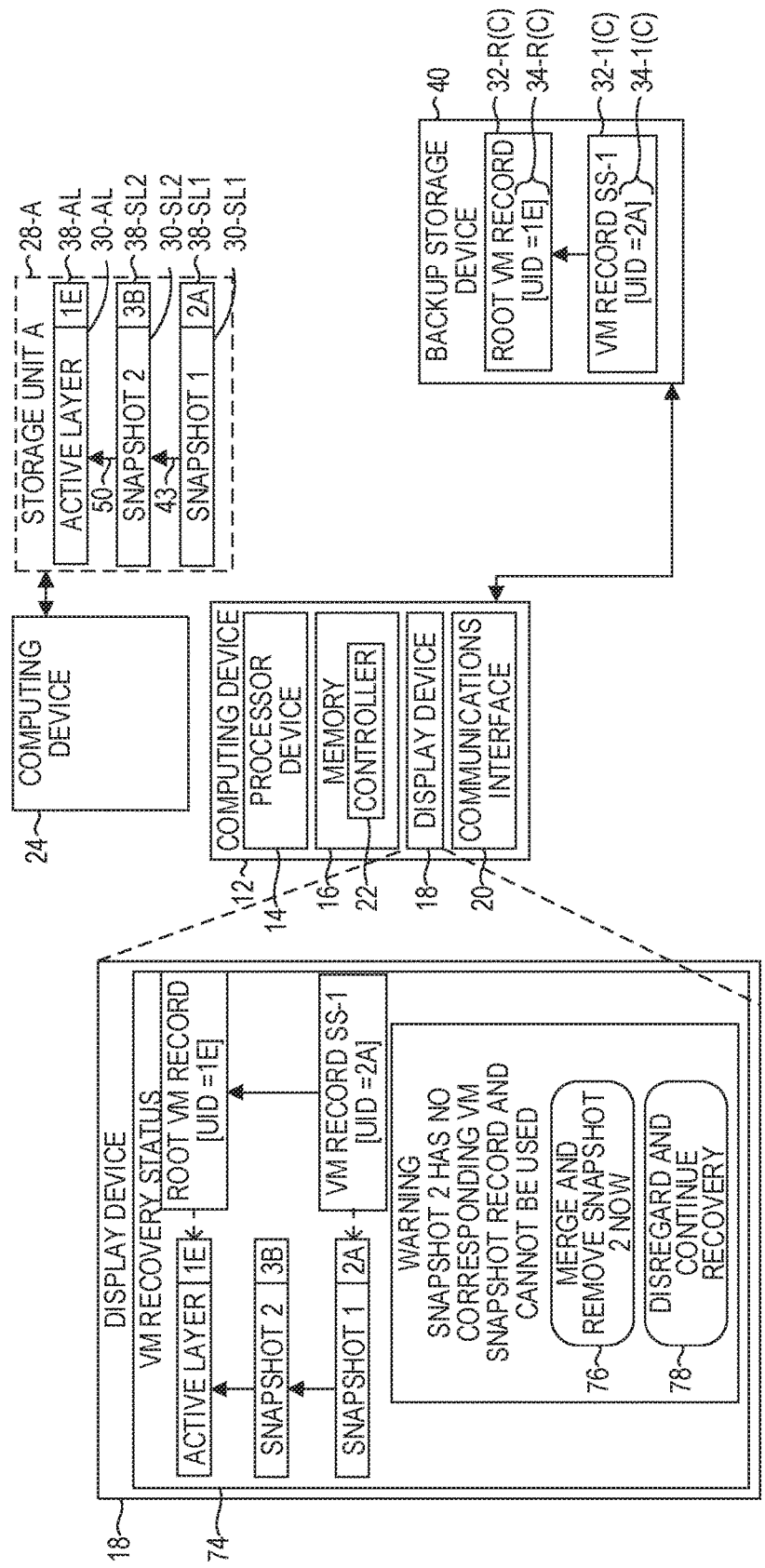

FIGS. 5A-5B are block diagrams illustrating the environment 10-1 at different points in time to illustrate a VM synchronization analysis and recovery process according to one example. Referring first to FIG. 5A, assume that the following occurs rather than as was described previously with regard to FIG. 1C. The computing device 12 receives the snapshot request 48 and generates the snapshot layer 30-SL2 and the VM record 32-2, as discussed above with regard to FIG. 1C. However, prior to storing a copy of the VM record 32-2 on the backup storage device 40, a disaster occurs causing the VM 26 to terminate and the storage device 36 to be inaccessible, as illustrated in FIG. 5B.

Referring now to FIG. 5B, the VM 26 has terminated, and the storage device 36 is no longer available. The controller 22 performs a synchronization analysis by accessing the VM records 32-R(C) and 32-1(C) on the backup storage device 40 to obtain the respective unique VM record IDs 34-R(C) and 34-1(C). The controller 22 accesses the storage unit 28-A, and, based on the VM record ID metadata 38-AL, determines that the active layer 30-AL corresponds to the root VM record 32-R(C). The controller 22, based on the VM record ID metadata 38-SL1, determines that the snapshot layer 30-SL1 corresponds to the VM record 32-1(C). The controller 22 accesses the VM record ID metadata 38-SL2, and determines that there is no corresponding VM record that corresponds to the snapshot layer 30-SL2, and thus that the VM records 32 and the layers 30 are not synchronized. The controller 22 then performs a missing VM record action. In one example, the missing VM record action may be to merge the snapshot layer 30-SL2 with the active layer 30-AL, remove the snapshot layer 30-SL2, and present information, in the form of a message, on the display device 18 indicating that a VM record does not exist for the snapshot layer 30-SL2 and that the snapshot layer 30-SL2 was merged with the active layer 30-AL.

In another example, the controller 22 may generate a user interface 74 containing information that indicates there is a missing VM record, and which provides the operator one or more options for proceeding. In this example, the operator may select a first control 76 which, if selected, directs the controller 22 to merge the snapshot layer 30-SL2 with the active layer 30-AL, remove the snapshot layer 30-SL2, and continue with the recovery process. The operator may select a second control 78 which, if selected, directs the controller 22 to disregard the missing VM record and continue with the recovery process, in which case the controller 22 simply disregards the snapshot layer 30-SL2. This action may be desirable, for example, when an operator, during recovery, does not wish to delay the recovery of the VM while the snapshot layer 30-SL2 is being merged. The operator may, at a subsequent time, merge the snapshot layer 30-SL2 with the active layer 30-AL, or perform some other action.

Figure 6A:
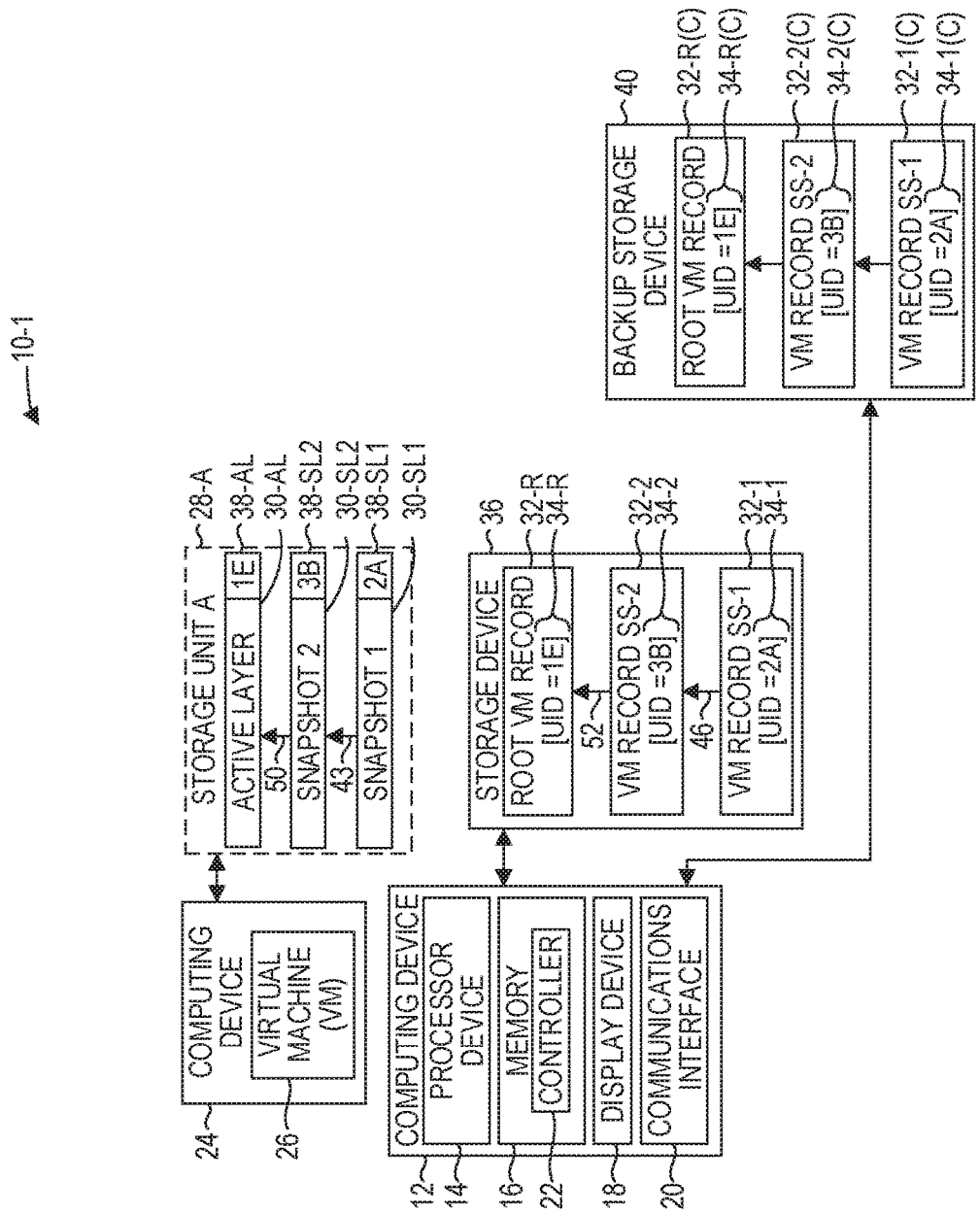
FIGS. 6A-6C are block diagrams illustrating the environment illustrated in FIG. 1 at different points in time to illustrate a VM synchronization analysis and recovery process according to another example.
Figure 6B:
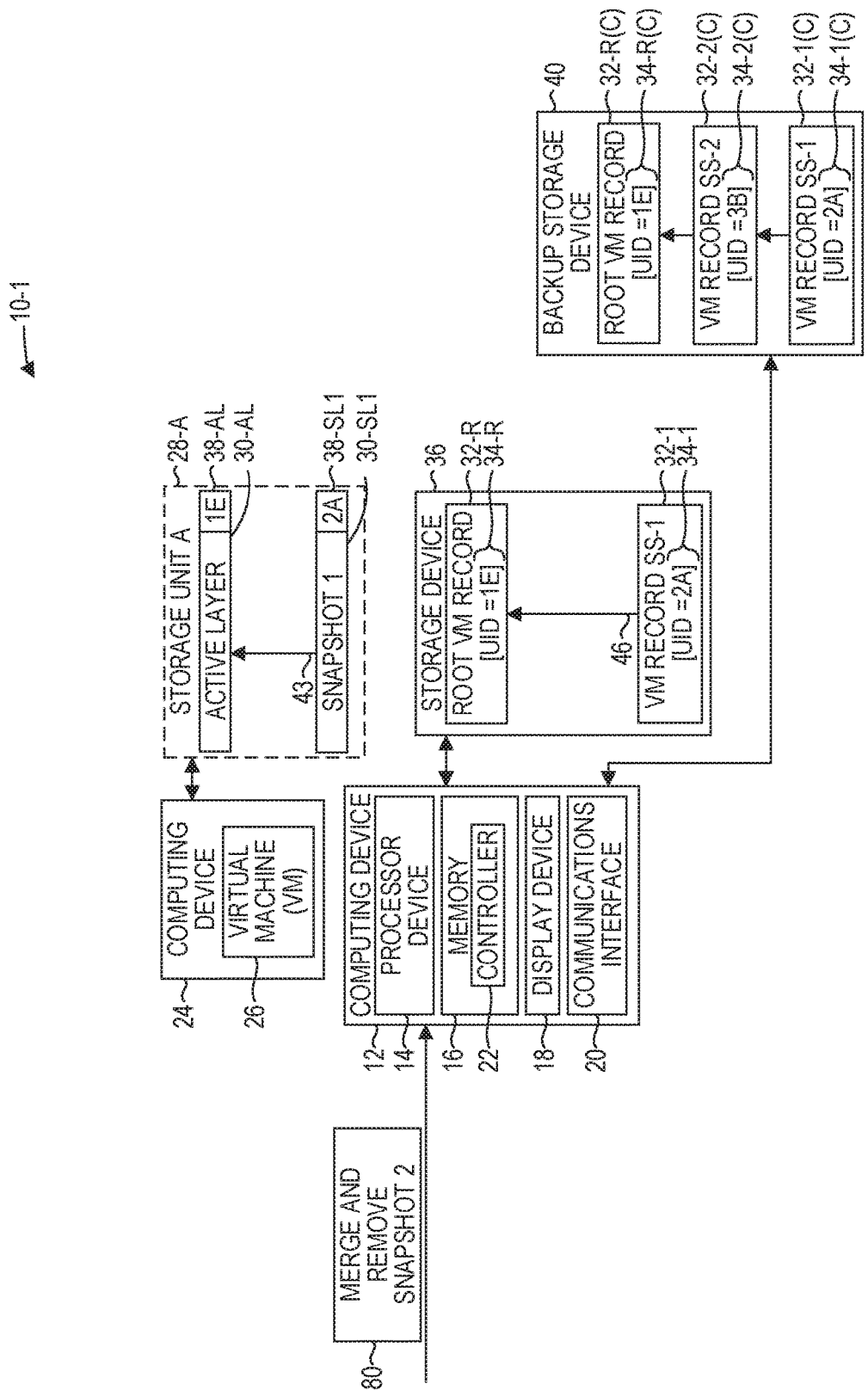
Figure 6C:
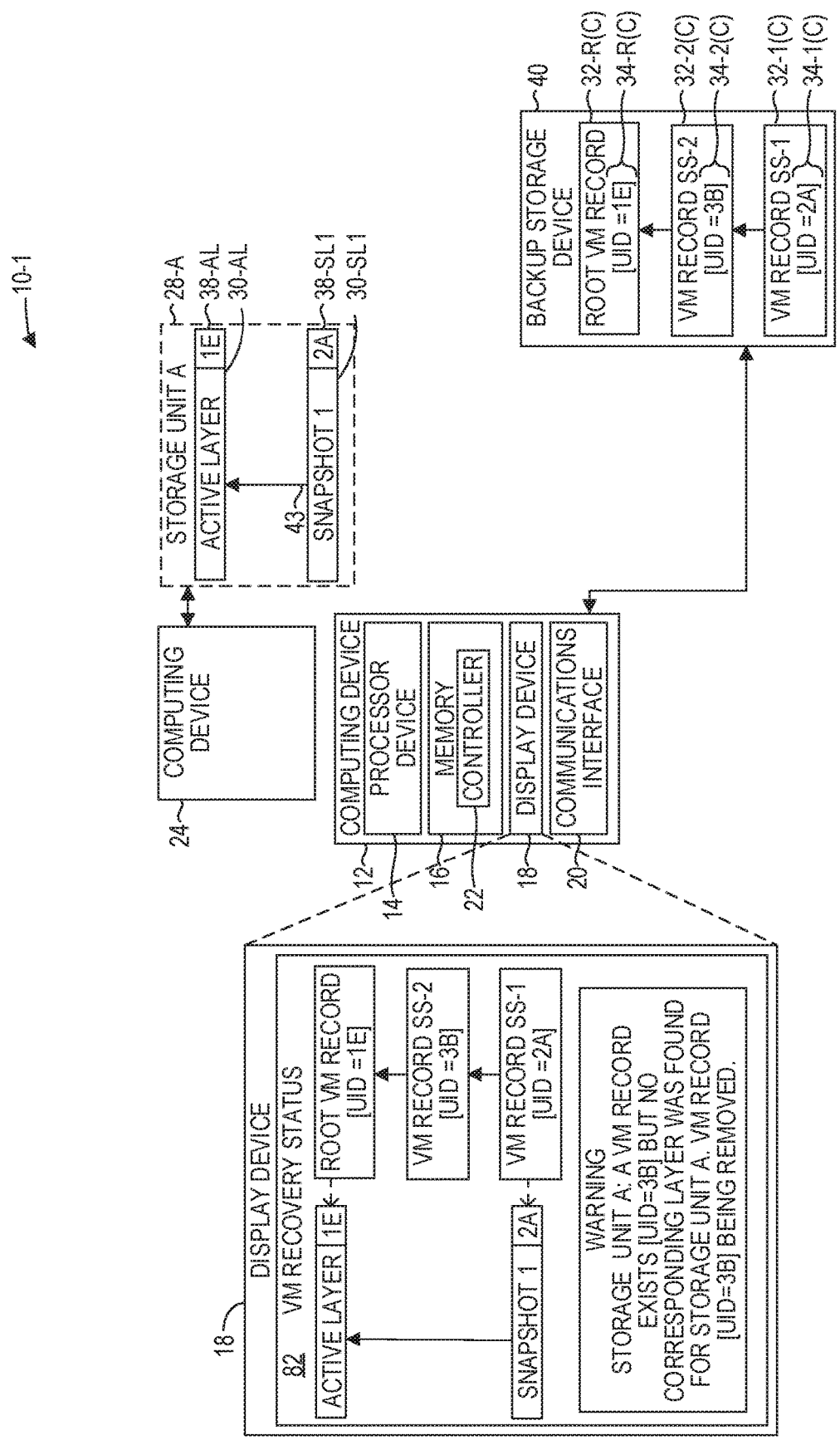

FIGS. 6A-6C are block diagrams illustrating the environment illustrated in FIG. 1 at different points in time to illustrate a VM synchronization analysis and recovery process according to another example. Referring first to FIG. 6A, the environment 10-1 is in the same state as illustrated in FIG. 1C after the second snapshot request 48 was received and successfully performed, and backed up on the backup storage device 40.

Referring now to FIG. 6B, the controller 22 receives a request 80 to merge and remove the second snapshot. In response, the controller 22 causes the snapshot layer 30-SL2 to be merged with the active layer 30-AL and removes the snapshot layer 30-SL2. The controller 22 removes the VM record 32-2. However, prior to removing the VM record 32-2(C) on the backup storage device 40, a disaster occurs causing the VM 26 to terminate and the storage device 36 to be inaccessible, as illustrated in FIG. 6C. Referring now to FIG. 6C, the VM 26 has terminated, and the storage device 36 is no longer available. The controller 22 performs a synchronization analysis by accessing the VM records 32-R(C), 32-1(C), and 32-2(C) on the backup storage device 40 to obtain the respective unique VM record IDs 34-R(C), 34-1(C), and 34-2(C). The controller 22 accesses the storage unit 28-A, and, based on the VM record ID metadata 38-AL, determines that the active layer 30-AL corresponds to the root VM record 32-R(C). The controller 22, based on the VM record ID metadata 38-SL1, determines that the snapshot layer 30-SL1 corresponds to the VM record 32-1(C). The controller 22 finds no snapshot layer that corresponds to the VM record 32-2(C), and thus determines that the VM records 32 and the layers 30 are not synchronized. The controller 22 then performs a missing snapshot layer action.

In one example, the missing snapshot layer action may be to generate a user interface 82 containing information that indicates that no snapshot layer corresponds to the VM record 32-2(C) and to automatically remove the VM record 32-2(C).

Figure 7A:
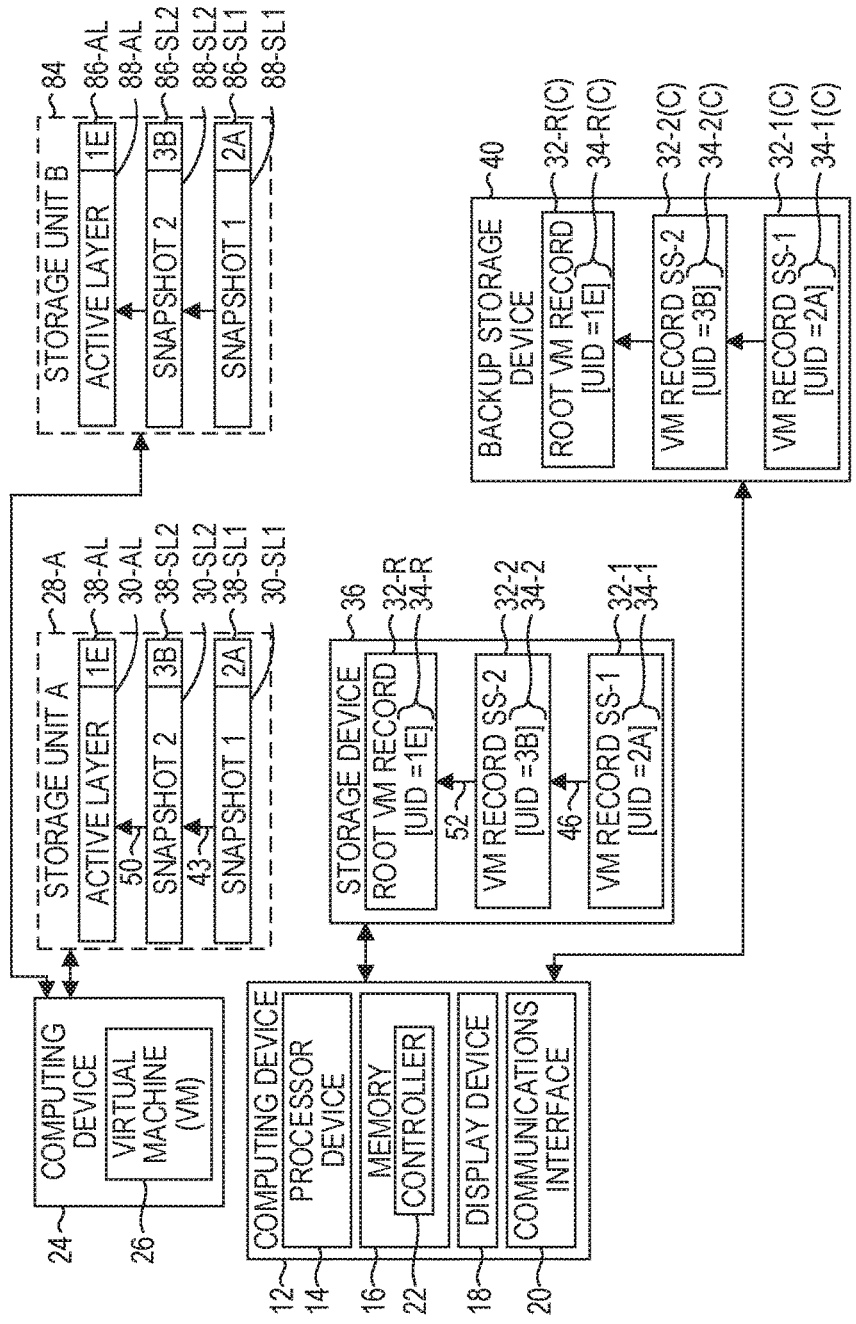
FIGS. 7A-7D are block diagrams illustrating an environment at different points in time to illustrate a VM synchronization analysis and recovery process according to another example.

FIGS. 7A-7D are block diagrams illustrating an environment 10-2 at different points in time to illustrate a VM synchronization analysis and recovery process according to another example. Referring first to FIG. 7A, the environment 10-2 is identical to the environment 10-1 except that the VM 26 utilizes two storage units, the storage unit 28-A and a storage unit 84. Two snapshots have been processed for the environment 10-2, and consequently the storage unit 84 has an active layer 86-AL, a snapshot layer 86-SL2 that is a child of the active layer 86-AL, and a snapshot layer 86-SL1 that is a child of the snapshot layer 86-SL2. The active layer 86-AL has associated VM record ID metadata 88-AL that contains the unique VM record ID 34-R to establish a correspondence between the active layer 86-AL and the root VM record 32-R. The snapshot layer 86-SL2 has an associated VM record ID metadata 88-SL2 that contains the unique VM record ID 34-2 to establish a correspondence between the snapshot layer 86-SL2 and the VM record 32-2. The snapshot layer 86-SL1 has an associated VM record ID metadata 88-SL1 that contains the unique VM record ID 34-1 to establish a correspondence between the snapshot layer 86-SL1 and the VM record 32-1.

Figure 7B:
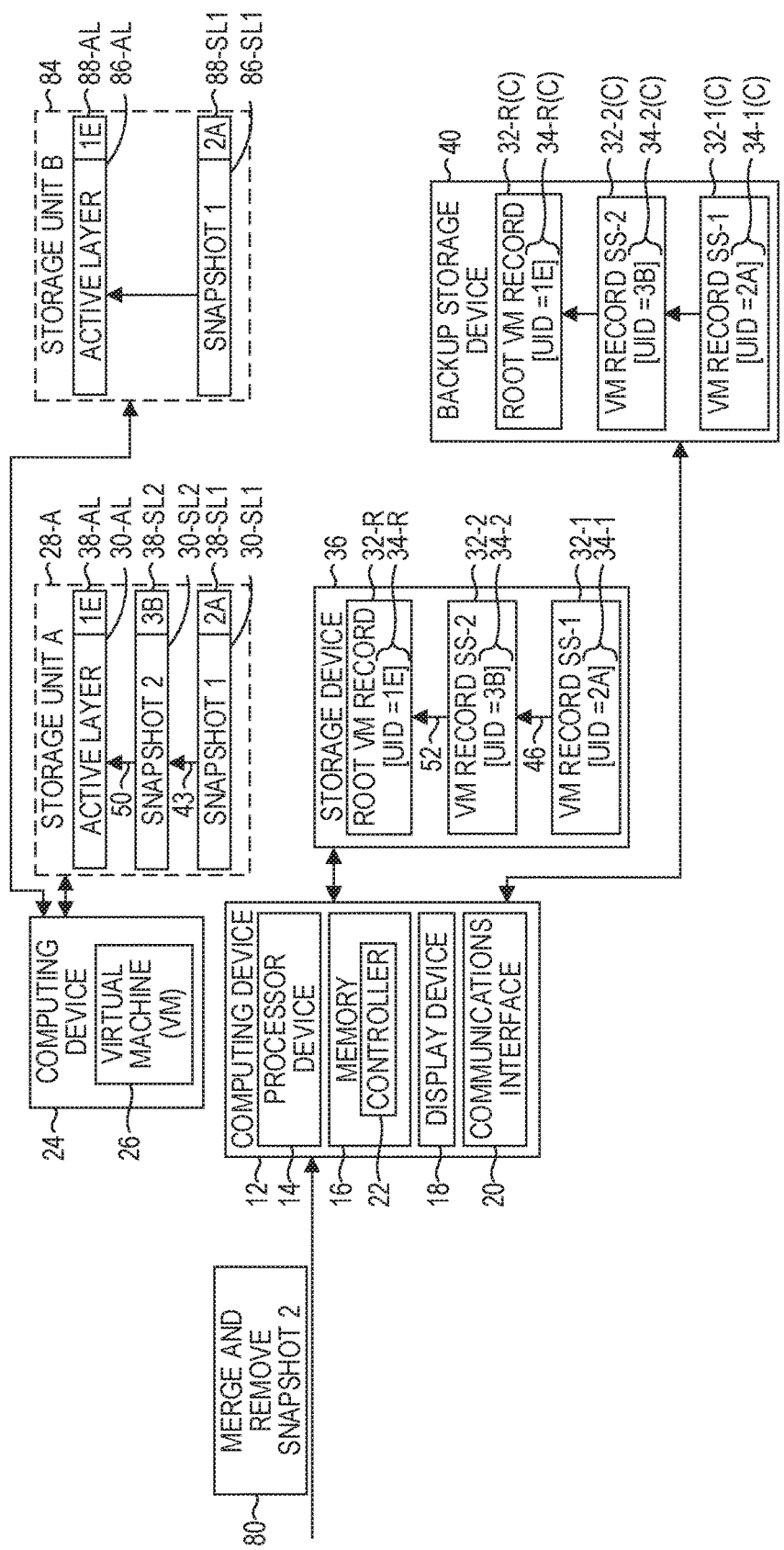

Referring now to FIG. 7B, the controller 22 receives a request 90 to merge and remove the second snapshot. In response, the controller 22 merges the snapshot layer 86-SL2 of the storage unit 84 with the active layer 86-AL and removes the snapshot layer 86-SL2. However, prior to removing the snapshot layer 30-SL2 of the storage unit 28-A, or removing the VM record 32-2, a disaster occurs causing the VM 26 to terminate and the storage device 36 to be inaccessible, as illustrated in FIG. 6C.

Figure 7C:
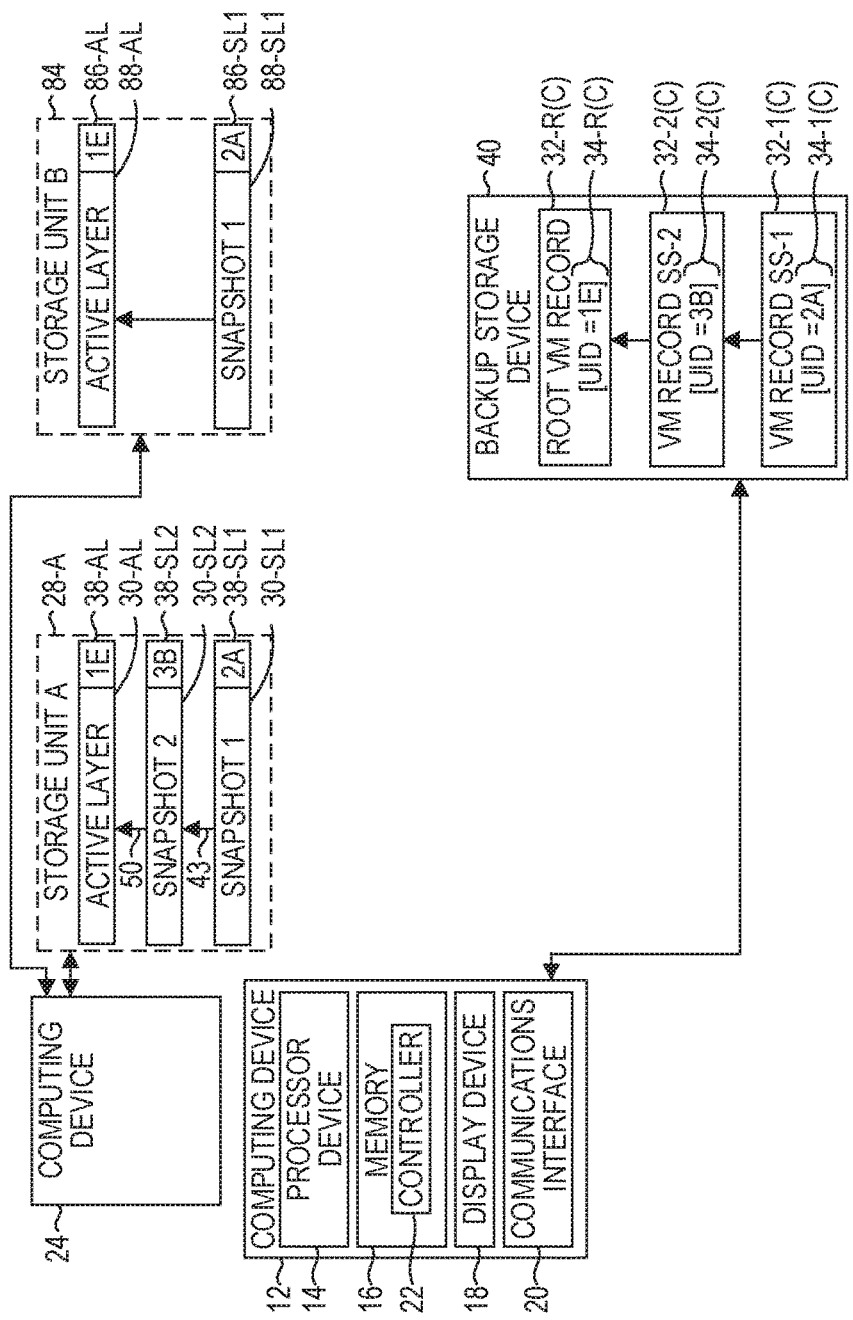

Referring now to FIG. 7C, the VM 26 has terminated, and the storage device 36 is no longer available. The controller 22 performs a synchronization analysis by accessing the VM records 32-R(C), 32-1(C) and 32-2(C) on the backup storage device 40 to obtain the respective unique VM record IDs 34-R(C), 34-1(C), and 34-2(C). The controller 22 accesses the storage unit 28-A, and determines that the layers 30-AL, 30-SL1, and 30-SL2 correspond to the VM records 32-R(C), 32-1(C), and 32-2(C), respectively, based on the VM record ID metadata 38-AL, 38-SL1, and 38-SL2. The controller 22 accesses the storage unit 84 and determines that there is no layer that corresponds to the VM record 32-2(C), and thus determines that the VM records 32 and the layers 86 are not synchronized. The controller 22 then performs a missing snapshot layer action.

Figure 7D:
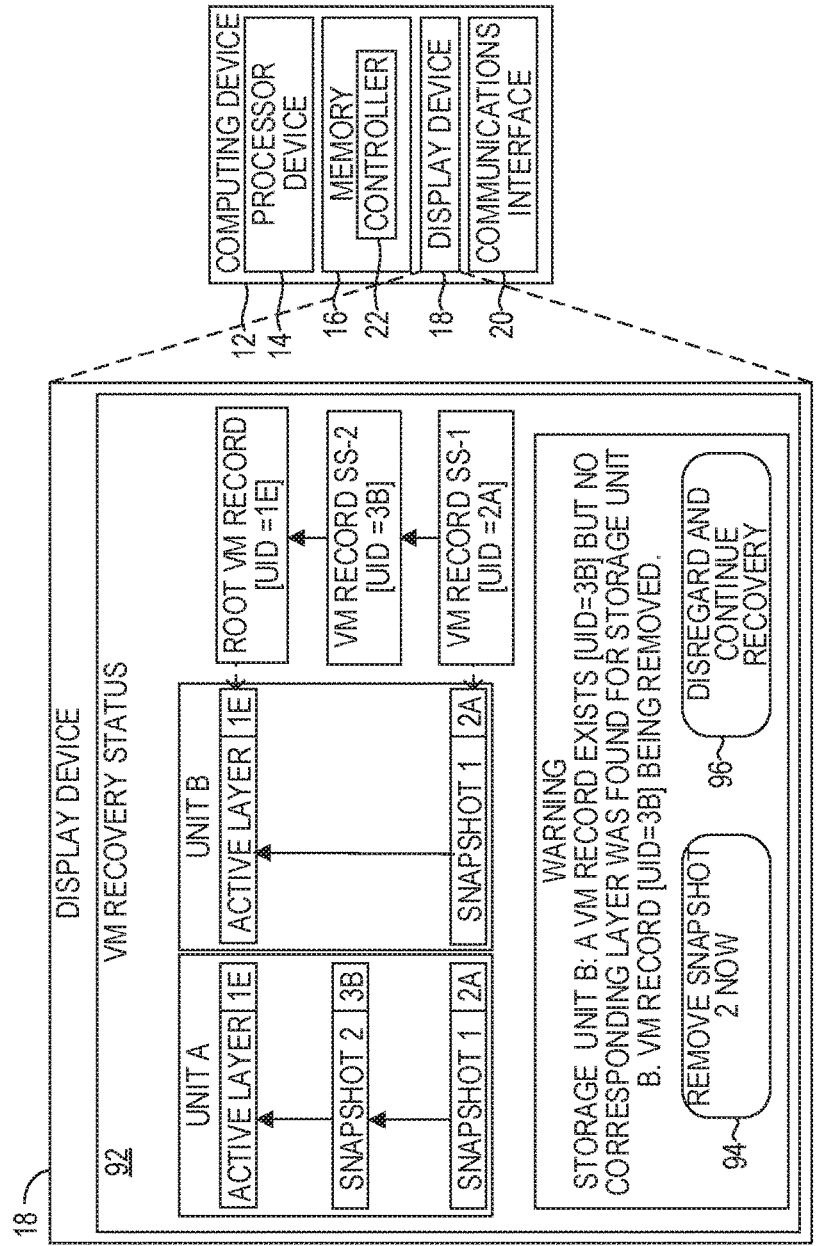

Referring now to FIG. 7D, in this example, the missing snapshot layer action is to generate a user interface 92 containing information that indicates that no snapshot layer corresponds to the VM record 32-2(C) for the storage unit 84. In this example, the user interface 92 includes a first control 94 which, if selected, directs the controller 22 to remove the second snapshot. Removing the second snapshot may involve merging the snapshot layer 30-SL2 with the active layer 30-AL of the storage unit 28-A, and removing the VM record 32-2(C). Alternatively, the operator may select a control 96, which directs the controller 22 to continue the recovery process. The operator may, at a subsequent time, request that the second snapshot be removed.

Figure 8:
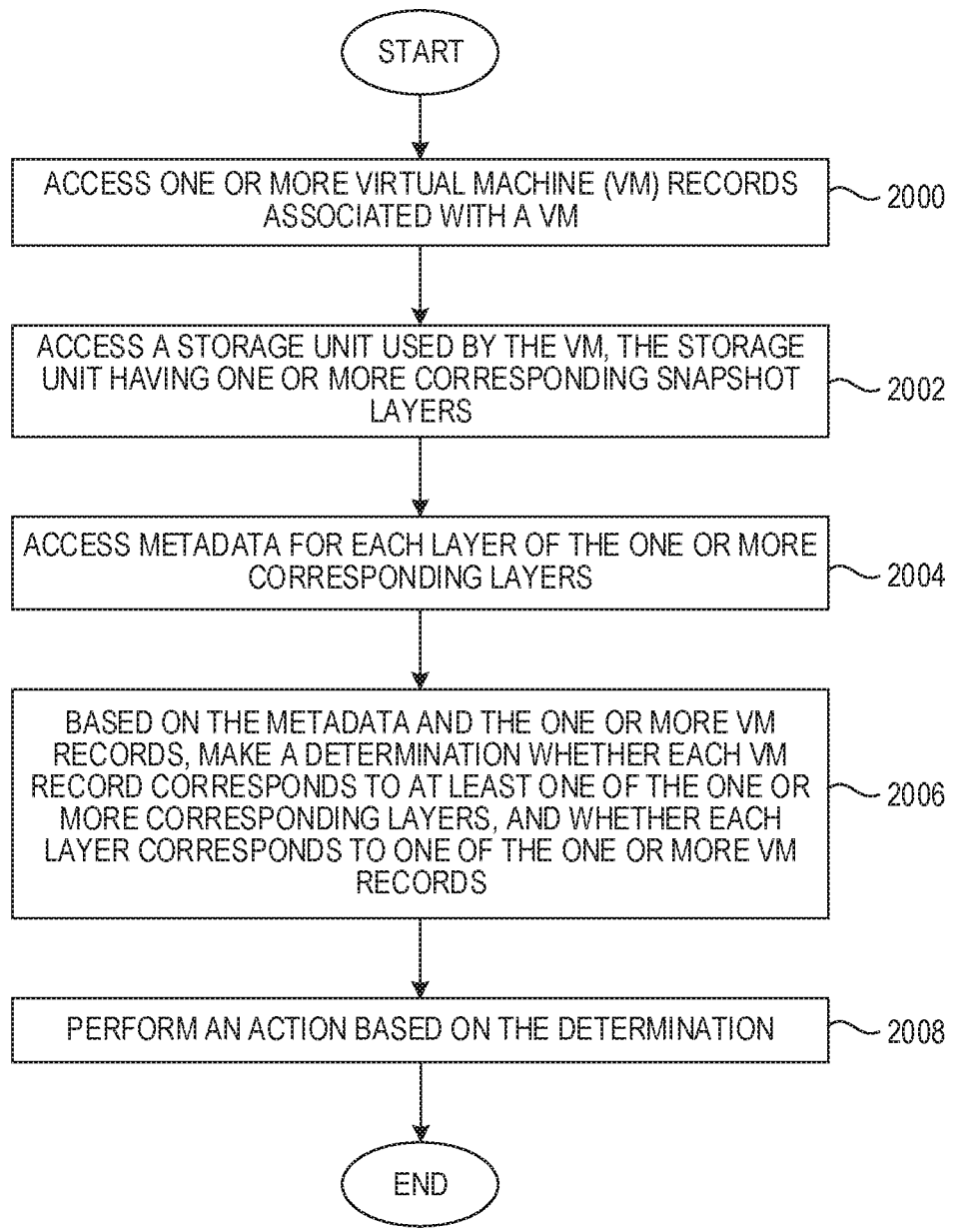
FIG. 8 is flowchart of a method for determining whether a VM is synchronized according to one example.

FIG. 8 is flowchart of a method for determining whether a VM is synchronized according to one example. The synchronization process may be performed, as discussed below, by the controller 22 during a recovery process. Alternatively, an operator may desire to determine whether or not a VM is synchronized even in the absence of a disaster. In some examples, a process that is separate from the controller 22 may be configured to implement the steps described herein solely to provide an operator a synchronization analysis of a VM. FIG. 8 will be discussed in conjunction with FIG. 7C. The computing device 12 accesses the one or more VM records 32-R(C), 32-2(C), and 32-1(C) associated with the VM 26 (FIG. 8, block 2000). The computing device 12 accesses the storage unit 28-A used by the VM 26, the storage unit 28-A having the one or more corresponding layers 30-AL, 30-SL2, and 30-SL1 (FIG. 8, block 2002). The computing device 12 accesses the VM record ID metadata 38-AL, 38-SL2, and 38-SL1 associated with each layer of one or more layers 30-AL, 30-SL2, and 30-SL1, respectively (FIG. 8, block 2004). The computing device 12, based on the VM record ID metadata 38-AL, 38-SL2, and 38-SL1 and the one or more VM records 32-R(C), 32-2(C), and 32-1(C), makes a determination whether each VM record 32-R(C), 32-2(C), and 32-1(C) corresponds to at least one of the layers 30-AL, 30-SL2, and 30-SL1, and whether each layer 30-AL, 30-SL2, and 30-SL1 corresponds to one of the VM records 32-R(C), 32-2(C), and 32-1(C) (FIG. 8, block 2006). The computing device 12 then performs an action based on the determination (FIG. 8, block 2008).

Figure 9A:
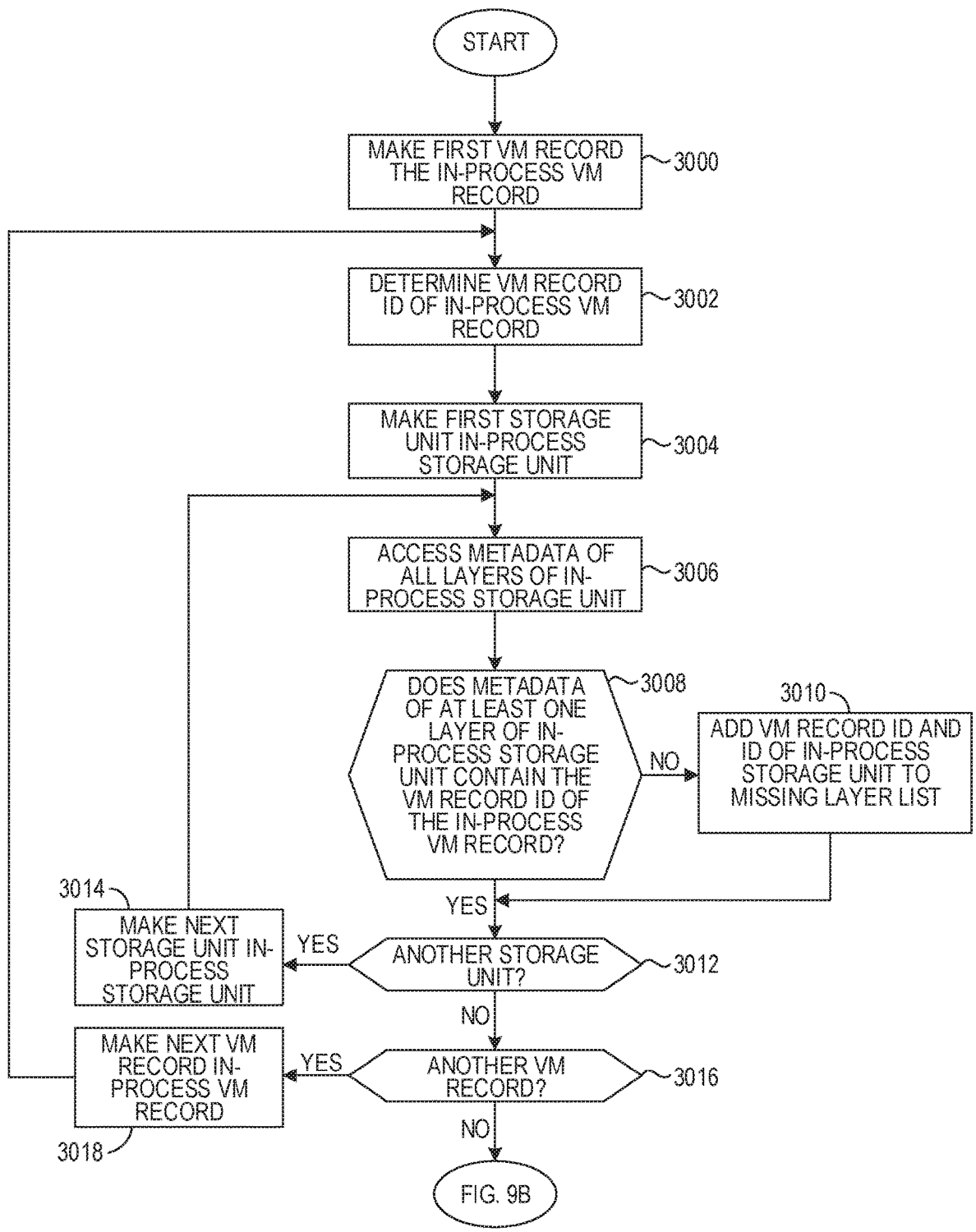
FIGS. 9A-9C are a flowchart of a method for determining whether a VM is synchronized according to another example.
Figure 9B:
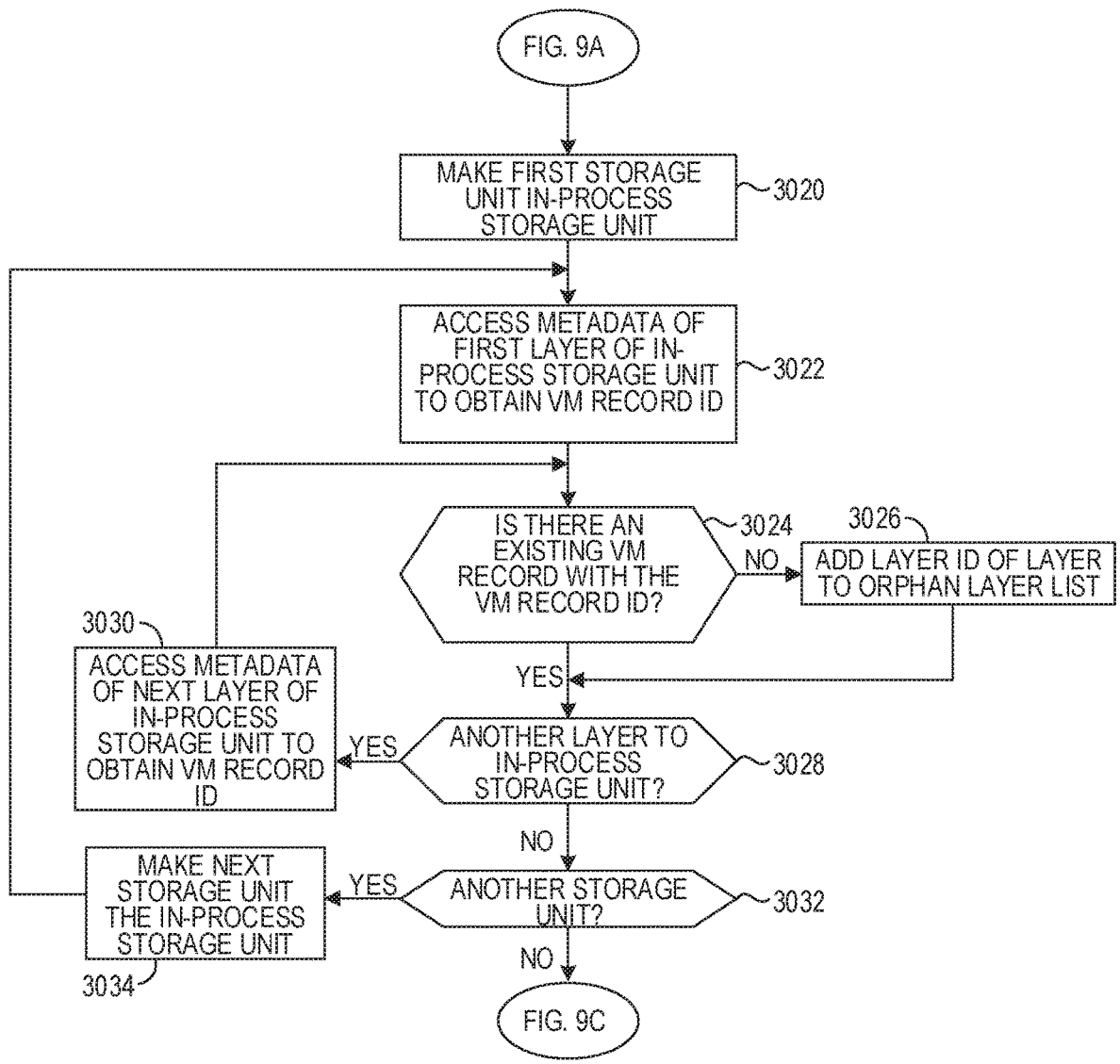
Figure 9C:
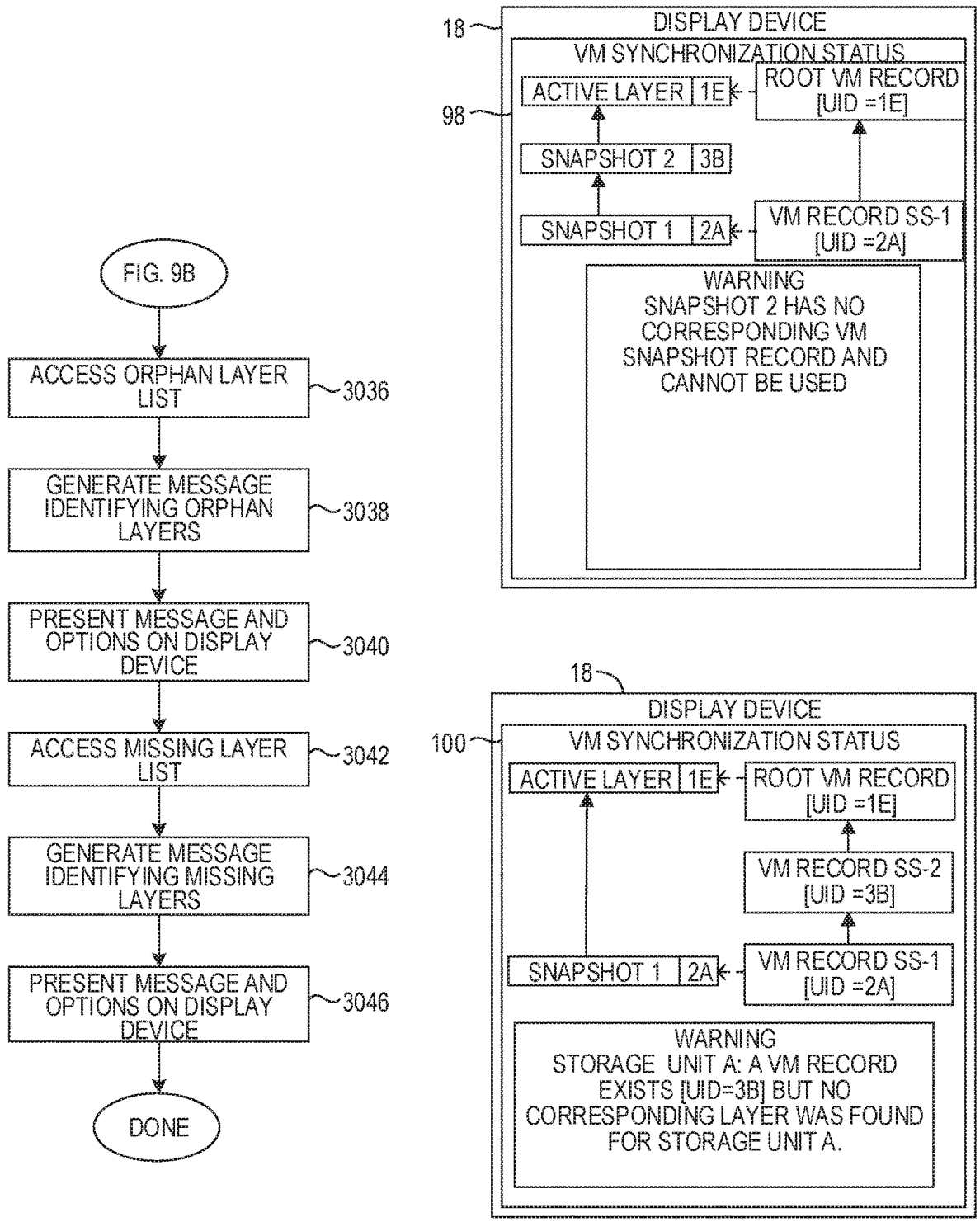

FIGS. 9A-9C are a flowchart of a method for determining whether a VM is synchronized according to another example. The method illustrated in 9A-9C operates in three stages, a first stage, discussed with regard to FIG. 9A, to determine whether each VM record corresponds to at least one layer of each storage unit. A second stage, discussed with regard to FIG. 9B, determines whether the metadata for each snapshot layer of each storage unit has a unique VM record ID of a valid (e.g., existing) VM record. A third stage, discussed with regard to FIG. 9C, analyzes the data produced by the first two stages and then takes appropriate action. FIG. 9A will be discussed in conjunction with FIG. 7C to illustrate the first stage of determining whether a snapshot layer exists for each VM record for each storage unit. The computing device 12 begins with the root VM record 32-R(C) (FIG. 9A, block 3000). The computing device 12 determines the VM record ID 34-R (FIG. 9A, block 3002). The computing device 12 then accesses the storage unit 28-A, and examines the metadata of the layers 30-AL, 30-SL2, and 30-SL1 to determine whether the metadata associated with at least one of the layers 30-AL, 30-SL2, and 30-SL1 contains the VM record ID 34-R (FIG. 9A, blocks 3004, 3006, 3008). If not, the computing device 12 adds an identifier of the storage unit 28-A and the VM record ID 34-R to a missing layer list for subsequent processing, as discussed below (FIG. 9A, block 3010). Thus, the missing layer list identifies those storage units that do not have a layer that corresponds to an existing VM record. In this example, the metadata of the layer 30-AL contains the VM record ID 34-R.

If at block 3008 the metadata associated with at least one of the layers 30-AL, 30-SL2, and 30-SL1 contains the VM record ID 34-R, the computing device 12 determines if the VM is associated with another storage unit (FIG. 9A, block 3012). In this case, the computing device 12 determines that the storage unit 84 needs to be analyzed, and accesses the metadata associated with the layers 86-AL and 86-SL1 (FIG. 9A, blocks 3014, 3006). The computing device 12 determines that the metadata associated with the layers 86-AL and 86-SL1 do not contain the VM record ID 34-R (FIG. 9A, block 3008). The computing device 12 then adds the VM record ID 34-R, or some other identifier of the VM record 32-R(C), and an identifier of the storage unit 84 to the missing layer list (FIG. 9A, block 3010). The computing device 12 determines that there are no other storage units to analyze (FIG. 9A, block 3012). The computing device 12 then determines that another VM record 32-2(C) exists, and the process described above is repeated for the VM record 32-2(C) (FIG. 9A, blocks 3016, 3018). This process is repeated for each remaining VM record. In some examples, as the computing device 12 accesses each VM record 32, the computing device 12 may load the VM records 32 into a data structure for use during the second stage discussed below with regard to FIG. 9B. At the end of the first stage, the missing layer list identifies each storage unit that does not have a layer that corresponds to a particular VM record.

Referring now to FIG. 9B, the computing device 12 accesses the storage unit 28-A (FIG. 9B, block 3020). The computing device 12 accesses the VM record ID metadata 38-AL of the active layer 30-AL (FIG. 9B, block 3022). The computing device 12 determines whether the VM record ID identified in the VM record ID metadata 38-AL matches the VM record ID of at least one of the VM records 32-R(C), 32-1(C) or 32-2(C) (FIG. 9B, block 3024). If not, the computing device 12 adds a layer ID that identifies the active layer 30-AL to an orphan layer list (FIG. 9B, block 3026). The computing device 12 repeats this process for the layers 30-SL2 and 30-SL1 (FIG. 9B, blocks 3028-3030). The computing device 12 then repeats this process for the storage unit 84 (FIG. 9B, blocks 3032, 3034). At the end of the second stage, the orphan layer list identifies, based on the metadata associated with the layers, each layer of each storage unit associated with the VM that corresponds to a VM record that does not exist.

Referring now to FIG. 9C, the computing device 12 accesses the orphan layer list (FIG. 9C, block 3036). The computing device 12 then generates a message 98 that identifies the orphan layers, i.e., those storage unit layers that do not correspond to an existing VM record (FIG. 9C, block 3038). The computing device 12 presents the message 98 on the display device 18 (FIG. 9C, block 3040). In this example, the message 98 merely provides information identifying which layers have no corresponding VM record. In this particular example, the user interface 74 would correspond to the situation in FIG. 5B, where the snapshot layer 30-SL2 corresponds to a VM record that does not exist.

The computing device 12 then accesses the missing layer list (FIG. 9C, block 3042). The computing device 12 then generates a message 100 that identifies the missing layers i.e., layers that are identified in an existing VM record but are not found on the respective storage unit (FIG. 9C, block 3044). The computing device 12 presents the message 100 on the display device 18 (FIG. 9C, block 3046). In this example, the message 100 merely provides information identifying the missing layers. In this particular example, the message 100 would correspond to the situation in FIG. 6C, where the storage unit 28-A is missing a snapshot layer that corresponds to the VM record 32-2(C).

Figure 10:
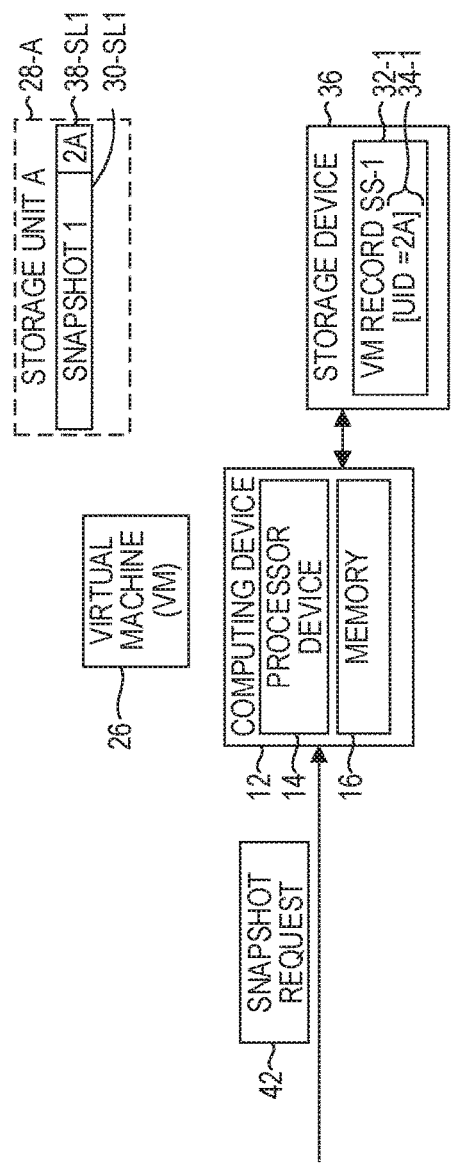
FIG. 10 is a simplified block diagram of the environment illustrated in FIG. 1B, according to another example.

FIG. 10 is a simplified block diagram of the environment 10-1 illustrated in FIG. 1B, according to another example. The computing device 12 includes the memory 16 and the processor device 14, which is coupled to the memory 16. The processor device 14 is to receive, at a first instance in time, the first snapshot request 42 to generate the first snapshot of the VM 26, the VM 26 utilizing the storage unit 28-A. The processor device 14 is to generate, for the storage unit 28-A, the first snapshot layer 30-SL1, the first snapshot layer 30-SL1 preserving a state of the storage unit 28-A at the first instance in time. The processor device 14 is to generate the VM record 32-1 that corresponds to the snapshot request 42 and that includes the VM record ID 34-1. The processor device 14 is to store, in the VM record ID metadata 38-SL1 associated with the snapshot layer 30-SL1, the VM record ID 34-1. The processor device 14 is to store the VM record 32-1 in a location such as the storage device 36.

Figure 11:
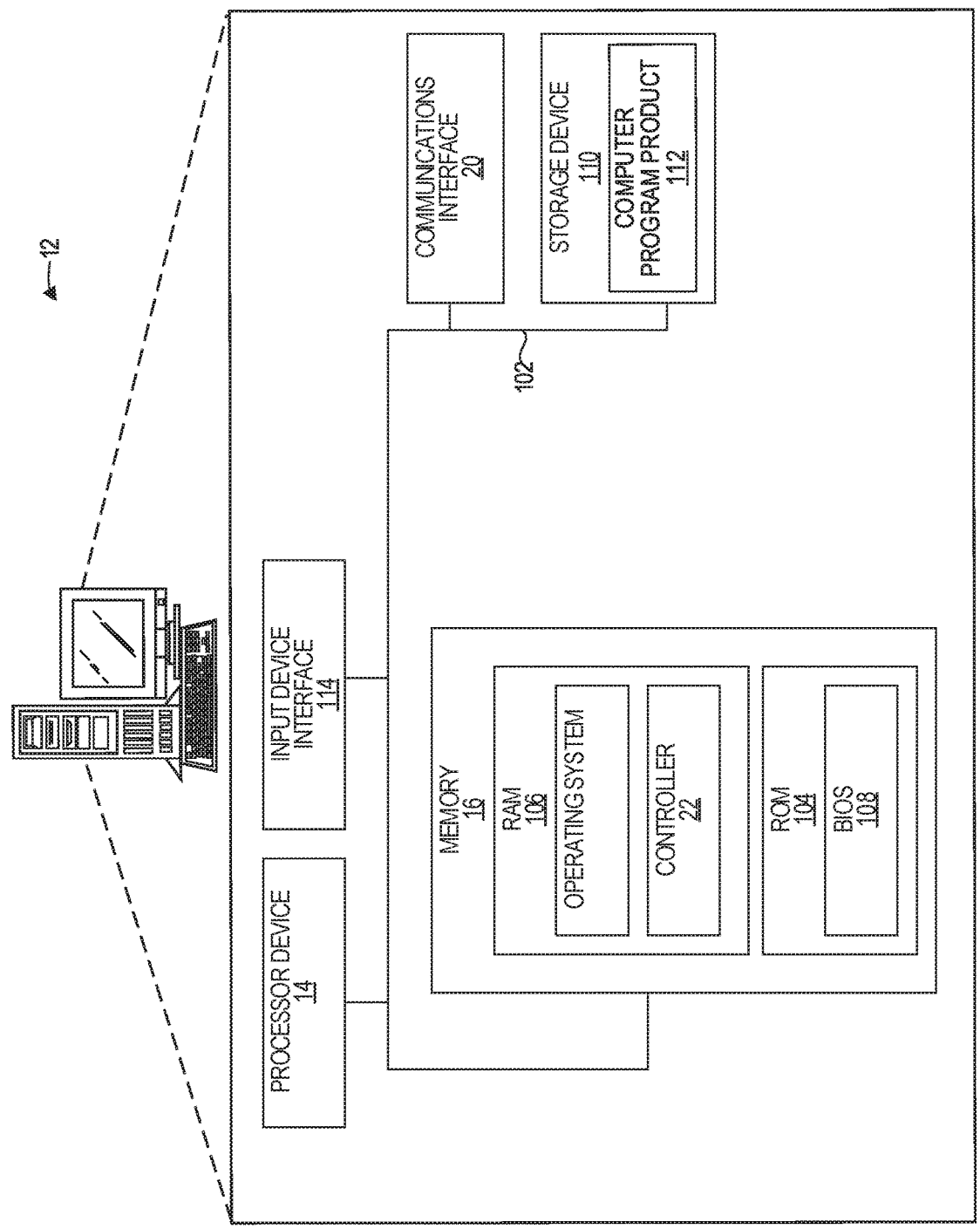
FIG. 11 is a block diagram of a computing device suitable for implementing examples according to one example.

FIG. 11 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the memory 16, and a system bus 102. The system bus 102 provides an interface for system components including, but not limited to, the memory 16 and the processor device 14. The processor device 14 can be any commercially available or proprietary processor.

The system bus 102 may be any of several types of bus structures that may further interconnect to a memory bus (with or without a memory controller), a peripheral bus, and/or a local bus using any of a variety of commercially available bus architectures. The memory 16 may include non-volatile memory 104 (e.g., read-only memory (ROM), erasable programmable read-only memory (EPROM), electrically erasable programmable read-only memory (EEPROM), etc.), and volatile memory 106 (e.g., random-access memory (RAM)). A basic input/output system (BIOS) 108 may be stored in the non-volatile memory 104 and can include the basic routines that help to transfer information between elements within the computing device 12. The volatile memory 106 may also include a high-speed RAM, such as static RAM, for caching data.

The computing device 12 may further include or be coupled to a non-transitory computer-readable storage medium such as a storage device 110, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 110 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 110 and in the volatile memory 106, including an operating system and one or more program modules, such as the controller 22, which may implement the functionality described herein in whole or in part.

All or a portion of the examples may be implemented as a computer program product stored 112 on a transitory or non-transitory computer-usable or computer-readable storage medium, such as the storage device 110, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the controller 22 in the volatile memory 106, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as the display device 18 (FIG. 1A). Such input devices may be connected to the processor device 14 through an input device interface 114 that is coupled to the system bus 102 but can be connected by other interfaces such as a parallel port, an Institute of Electrical and Electronic Engineers (IEEE) 1394 serial port, a Universal Serial Bus (USB) port, an IR interface, and the like.

The computing device 12 may also include the communications interface 20 suitable for communicating with a network as appropriate or desired.

Other computer system designs and configurations may also be suitable to implement the systems and methods described herein. The following examples illustrate various implementations in accordance with one or more aspects of the disclosure.

Example 1 is a method comprising accessing one or more virtual machine (VM) records associated with a VM; accessing a storage unit used by the VM, the storage unit having one or more corresponding snapshot layers; accessing metadata for each snapshot layer of the one or more corresponding snapshot layers; based on the metadata and the one or more VM records, making a determination whether each VM record corresponds to at least one of the one or more corresponding snapshot layers, and whether each snapshot layer corresponds to one of the one or more VM records; and performing an action based on the determination.

Example 2 is the method of example 1 wherein performing the action comprises presenting information that identifies whether each VM record corresponds to at least one of the one or more corresponding snapshot layers of the storage unit, and whether each snapshot layer corresponds to one of the one or more VM records.

Example 3 is the method of example 2 further comprising presenting at least one control identifying an option for recovering the VM in view of the information; receiving a selection of the at least one control; and implementing the option.

Example 4 is the method of example 2 further comprising determining that metadata associated with a snapshot layer of the one or more corresponding snapshot layers identifies a VM record that does not exist; and in response to determining that the VM record does not exist, performing a missing VM record action.

Example 5 is the method of example 4 wherein the missing VM record action comprises one of presenting information on a display device that indicates the VM record does not exist; and merging the snapshot layer with an active layer of the storage unit, and removing the snapshot layer.

Example 6 is the method of example 1 further comprising determining that no metadata of any snapshot layer indicates that a snapshot layer corresponds to one of the one or more VM records; and presenting information that identifies the storage unit as lacking a snapshot layer that corresponds to the one of the one or more VM records.

Example 7 is the method of example 1 wherein each snapshot layer comprises a separate volume, and the storage unit comprises at least one active volume in which subsequent modifications to data are reflected, and at least one snapshot volume that preserves a historical state of the data of the storage unit at a particular instant in time in the past.

Example 8 is the method of example 7 wherein the storage unit comprises at least two snapshot volumes, each snapshot volume preserving a historical state of the data of the storage unit at a particular different instant in time in the past.

Example 9 is the method of example 8 wherein the VM is implemented in a cloud computing environment.

Example 10 is a computing device that includes a memory, and a processor device coupled to the memory. The processor device is to access one or more virtual machine (VM) records associated with a VM; access a storage unit used by the VM, the storage unit having one or more corresponding snapshot layers; access metadata for each snapshot layer of the one or more corresponding snapshot layers; based on the metadata and the one or more VM records, make a determination whether each VM record corresponds to at least one of the one or more corresponding snapshot layers, and whether each snapshot layer corresponds to one of the one or more VM records; and perform an action based on the determination.

Example 11 is the computing device of example 10 wherein to perform the action, the processor device is to present information that identifies whether each VM record corresponds to at least one of the one or more corresponding snapshot layers of the storage unit, and whether each snapshot layer corresponds to one of the one or more VM records.

Example 12 is the computing device of example 11 wherein the processor device is to present at least one control identifying the option for recovering the VM in view of the information; receive a selection of the at least one control; and implement the option.

Example 13 is the computing device of example 11 wherein the processor device is to determine that metadata associated with a snapshot layer of the one or more corresponding snapshot layers identifies a VM record that does not exist; and in response to determining that the VM record does not exist perform a missing VM record action.

Example 14 is a computing device that includes a snapshot request receiver to receive a snapshot request to generate a snapshot of a virtual machine (VM); a snapshot layer generator to generate, for a storage unit, a snapshot layer that preserves the state of the storage unit at that particular instance in time; a VM record generator to generate a VM record that corresponds to a received snapshot request, and that includes a unique VM record ID; a metadata storer to store, in VM record ID metadata associated with the snapshot layer, the unique VM record ID; and a VM record storer to store the VM record in a first location.

Example 15 is a computing device that includes a means for receiving, at a first instance in time, a first snapshot request to generate a first snapshot of a virtual machine (VM), the VM utilizing a storage unit; a means for generating, for the storage unit, a first snapshot layer, the first snapshot layer preserving a state of the storage unit at the first instance in time; a means for generating a first VM record that corresponds to the first snapshot request and that includes a first unique VM record ID; a means for storing, in metadata associated with the first snapshot layer, the VM record ID; and a means for storing the first VM record in a first location.

Individuals will recognize improvements and modifications to the preferred examples of the disclosure. All such improvements and modifications are considered within the scope of the concepts disclosed herein and the claims that follow.

What is claimed is:

1. A method comprising:
   receiving, at a first instance in time, a first snapshot request to generate a first snapshot of a virtual machine (VM), the VM utilizing a storage unit;
   generating, for the storage unit, a first snapshot layer, the first snapshot layer preserving a state of the storage unit at the first instance in time;
   generating a first VM record that corresponds to the first snapshot request and that includes a first VM record identifier (ID);
   storing, in metadata associated with the first snapshot layer, the first VM record ID; and
   storing the first VM record in a first location;
   receiving, at a second instance in time, a second snapshot request to generate a second snapshot of the VM;
   generating, for the storage unit, a second snapshot layer, the second snapshot layer preserving a state of the storage unit at the second instance in time;
   generating a second VM record that corresponds to the second snapshot request and that includes a second VM record ID; and
   storing, in metadata associated with the second snapshot layer, the second VM record ID;
   determining that a synchronization analysis is to be performed for the VM; and
   at least one of:
      determining that a copy of the second VM record does not exist on a backup location and performing a missing VM record action; or
      determining that the copy of the second VM record exists on the backup location and that no snapshot layer associated with the storage unit has metadata that contains the second VM record ID and performing a missing snapshot layer action.

2. The method of claim 1 further comprising storing a copy of the first VM record at the backup location that is different from the first location.

3. The method of claim 2:
   wherein determining that the synchronization analysis is to be performed is subsequent to the second instance in time and prior to storing a copy of the second VM record at the backup location;
   further comprising:
      determining that the copy of the first VM record exists on the backup location;
      accessing the metadata associated with the second snapshot layer;
      determining that the metadata associated with the second snapshot layer identifies the second VM record;
      determining that the copy of the second VM record does not exist on the backup location; and
      in response to determining that the copy of the second VM record does not exist on the backup location, performing a missing VM record action.

4. The method of claim 3 wherein the missing VM record action comprises one of:
   presenting information on a display device that indicates the copy of the second VM record does not exist; and
   merging the second snapshot layer with an active layer of the storage unit, and removing the second snapshot layer.

5. The method of claim 2
   further comprising:
      storing a copy of the second VM record at the backup location;
      removing the second snapshot layer;
      removing the second VM record;
   wherein determining that the synchronization analysis is to be performed for the VM is subsequent to removing the copy of the second VM record on the backup location;
   further comprising:
      determining that the copy of the second VM record exists on the backup location;
      determining that no snapshot layer associated with the storage unit has metadata that contains the second VM record ID; and
      in response to determining that no snapshot layer associated with the storage unit has metadata that contains the second VM record ID, performing a missing snapshot layer action.

6. The method of claim 5 wherein performing the missing snapshot layer action comprises one of:
   presenting information on a display device that indicates that no snapshot layer corresponds to the second VM record; and
   removing the second VM record.

7. The method of claim 2 wherein the VM utilizes a plurality of storage units, including the storage unit, and further comprising:
   generating a plurality of first snapshot layers, each first snapshot layer preserving a state of a corresponding one of the plurality of storage units at the first instance in time; and
   storing, in separate metadata associated with each of the first snapshot layers, the first VM record ID.

8. The method of claim 7 further comprising:
   generating a plurality of second snapshot layers, each second snapshot layer preserving a state of a corresponding one of the plurality of storage units at the second instance in time; and
   storing, in separate metadata associated with each of the second snapshot layers, the second VM record ID.

9. The method of claim 8 further comprising:
   storing a copy of the first VM record at the backup location that is different from the first location;
   storing a copy of the second VM record at the backup location;
   removing one of the second snapshot layers of the plurality of second snapshot layers;
   subsequent to removing the one of the second snapshot layers, determining that a synchronization analysis is to be performed for the VM;
   determining that the copy of the second VM record exists on the backup location;
   determining that the plurality of second snapshot layers, other than the one of the second snapshot layers, exists and corresponds to the second VM record; and
   presenting information on a display that indicates the plurality of second snapshot layers, other than the one of the second snapshot layers, exists, and that the one of the second snapshot layers does not exist.

10. A computing device, comprising:
    a memory; and
    a processor device coupled to the memory to:
       receive, at a first instance in time, a first snapshot request to generate a first snapshot of a virtual machine (VM), the VM utilizing a storage unit;

generate, for the storage unit, a first snapshot layer, the first snapshot layer preserving a state of the storage unit at the first instance in time;

generate a first VM record that corresponds to the first snapshot request and that includes a first VM record identifier (ID);

store, in metadata associated with the first snapshot layer, the first VM record ID; and store the first VM record in a first location;

receive, at a second instance in time, a second snapshot request to generate a second snapshot of the VM;

generate, for the storage unit, a second snapshot layer, the second snapshot layer preserving a state of the storage unit at the second instance in time;

generate a second VM record that corresponds to the second snapshot request and that includes a second VM record ID; and store, in metadata associated with the second snapshot layer, the second VM record ID;

determine that a synchronization analysis is to be performed for the VM; and at least one of:
- determine that a copy of the second VM record does not exist on a backup location and performing a missing VM record action; or
- determine that the copy of the second VM record exists on the backup location and that no snapshot layer associated with the storage unit has metadata that contains the second VM record ID and performing a missing snapshot layer action.

11. The computing device of claim 10 wherein the processor device is further to store a copy of the first VM record at the backup location that is different from the first location.

12. The computing device of claim 11:
wherein determining that the synchronization analysis is to be performed is subsequent to the second instance in time and prior to storing a copy of the second VM record at the backup location;
wherein the processor device is further to:
determine that the copy of the first VM record exists on the backup location;
access the metadata associated with the second snapshot layer;
determine that the metadata associated with the second snapshot layer identifies the second VM record;
determine that the copy of the second VM record does not exist on the backup location; and
in response to determining that the copy of the second VM record does not exist on the backup location, perform a missing VM record action.

13. The computing device of claim 10
wherein the processor device is further to:
store a copy of the second VM record at the backup location;
remove the second snapshot layer;
remove the second VM record;
wherein determining that the synchronization analysis is to be performed for the VM is subsequent to removing the copy of the second VM record on the backup location;
wherein the processor device is further to:
determine that the copy of the second VM record exists on the backup location;
determine that no snapshot layer associated with the storage unit has metadata that contains the second VM record ID; and
in response to determining that no snapshot layer associated with the storage unit has metadata that contains the second VM record ID, perform a missing snapshot layer action.

14. A computer program product stored on a non-transitory computer-readable storage medium and including instructions to cause a processor device to:
receive, at a first instance in time, a first snapshot request to generate a first snapshot of a virtual machine (VM), the VM utilizing a storage unit;
generate, for the storage unit, a first snapshot layer, the first snapshot layer preserving a state of the storage unit at the first instance in time;
generate a first VM record that corresponds to the first snapshot request and that includes a first VM record identifier (ID);
store, in metadata associated with the first snapshot layer, the first VM record ID; and
store the first VM record in a first location;
receive, at a second instance in time, a second snapshot request to generate a second snapshot of the VM;
generate, for the storage unit, a second snapshot layer, the second snapshot layer preserving a state of the storage unit at the second instance in time;
generate a second VM record that corresponds to the second snapshot request and that includes a second VM record ID; and
store, in metadata associated with the second snapshot layer, the second VM record ID;
determine that a synchronization analysis is to be performed for the VM; and
at least one of:
- determine that a copy of the second VM record does not exist on a backup location and performing a missing VM record action; or
- determine that the copy of the second VM record exists on the backup location and that no snapshot layer associated with the storage unit has metadata that contains the second VM record ID and performing a missing snapshot layer action.

15. The computer program product of claim 14 wherein the instructions further cause the processor device to store a copy of the first VM record at the backup location that is different from the first location.

16. The computer program product of claim 15:
wherein determining that the synchronization analysis is to be performed for the VM is subsequent to the second instance in time and prior to storing a copy of the second VM record at the backup location;
wherein the instructions further cause the processor device to:
determine that the copy of the first VM record exists on the backup location;
access the metadata associated with the second snapshot layer;
determine that the metadata associated with the second snapshot layer identifies the second VM record;
determine that the copy of the second VM record does not exist on the backup location; and
in response to determining that the copy of the second VM record does not exist on the backup location, perform a missing VM record action.

17. The computer program product of claim 14
wherein the instructions further cause the processor device to:
store a copy of the second VM record at the backup location;

remove the second snapshot layer;
remove the second VM record;
wherein determining that the synchronization analysis is to be performed for the VM is subsequent to removing the copy of the second VM record on the backup location;
wherein the processor device is further to:
  determine that the copy of the second VM record exists on the backup location;
  determine that no snapshot layer associated with the storage unit has metadata that contains the second VM record ID; and
  in response to determining that no snapshot layer associated with the storage unit has metadata that contains the second VM record ID, perform a missing snapshot layer action.

* * * * *